(12) United States Patent
Zhang et al.

(10) Patent No.: US 12,394,101 B2
(45) Date of Patent: Aug. 19, 2025

(54) SEGMENT BASED COMPRESSION METHODS FOR MESH COMPRESSION

(71) Applicant: Tencent America LLC, Palo Alto, CA (US)

(72) Inventors: Xiang Zhang, Sunnyvale, CA (US); Chao Huang, Palo Alto, CA (US); Xiaozhong Xu, State College, PA (US); Jun Tian, Belle Mead, NJ (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 421 days.

(21) Appl. No.: 17/903,541

(22) Filed: Sep. 6, 2022

(65) Prior Publication Data

US 2023/0075304 A1 Mar. 9, 2023

Related U.S. Application Data

(60) Provisional application No. 63/241,481, filed on Sep. 7, 2021.

(51) Int. Cl.
*G06T 9/00* (2006.01)
(52) U.S. Cl.
CPC .................................. *G06T 9/001* (2013.01)
(58) Field of Classification Search
CPC .................................. G06T 9/001; G06T 1/00
See application file for complete search history.

(56) References Cited

U.S. PATENT DOCUMENTS

| 10,034,645 | B1* | 7/2018 | Williams | G06T 3/18 |
|---|---|---|---|---|
| 2019/0139266 | A1* | 5/2019 | Budagavi | G06T 17/20 |
| 2020/0043199 | A1* | 2/2020 | Chang | G06T 9/001 |
| 2020/0105024 | A1* | 4/2020 | Mammou | G06T 9/001 |
| 2020/0314435 | A1* | 10/2020 | Tourapis | G06T 7/74 |
| 2021/0090301 | A1 | 3/2021 | Mammou et al. | |

FOREIGN PATENT DOCUMENTS

WO 2021136876 A1 3/2016

OTHER PUBLICATIONS

European Search Report issued Dec. 5, 2023 in Application No. 22839976.2, pp. 1-10.

(Continued)

*Primary Examiner* — Ming Wu
(74) *Attorney, Agent, or Firm* — ArentFox Schiff LLP

(57) ABSTRACT

Aspects of the disclosure provide methods and apparatuses for mesh coding (e.g., compression and decompression). In some examples, an apparatus for mesh coding includes processing circuitry. The processing circuitry decodes, using a decoder supporting a first bitdepth, a plurality of segmental attribute values having the first bitdepth from a bitstream carrying a mesh that represents a surface of an object. The plurality of segmental attribute values is associated with attribute values of the mesh, the attribute values of the mesh have a second bitdepth that is higher than the first bitdepth. The processing circuitry determines the attribute values of the mesh having the second bitdepth according to the plurality of segmental attribute values having the first bitdepth.

20 Claims, 14 Drawing Sheets

(56) References Cited

OTHER PUBLICATIONS

Julius Kammerl et al: "Real-time compression of point cloud streams", Robotics and Automation (ICRA), 2012 IEEE International Conference on, IEEE, May 14, 2012, pp. 778-785.

Sungryeul Rhyu et al: "[V-PCC] [New Proposal] V-PCC extension for mesh coding", 126. MPEG Meeting; Mar. 25, 2019-Mar. 29, 2019; Geneva; (Motion Picture Expert Group or ISO/IEC JTC1/SC29/WG11), Mar. 20, 2019.

International Search Report and Written Opinion issued Nov. 22, 2022 in Application No. PCT/US2022/076019, pp. 1-10.

Ho et al. Improving compression ratios for high bit-depth grayscale video formats, 2016 IEEE Aerospace Conference, Jun. 30, 2016, pp. 1-9.

Draft CfP for Dynamic Mesh Coding, International Organization for Standardization Organisation Internationale De Normalisation ISO/IEC JTC 1/SC 29/WG 7 MPEG 3D Graphics Coding, ISO/IEC JTC 1/SC 29/WG 7 N 00122 Apr. 2021, Virtual, Serial No. MDS20403, Jul. 9, 2021, pp. 1-21.

* cited by examiner

SEGMENT BASED COMPRESSION METHODS FOR MESH COMPRESSION

INCORPORATION BY REFERENCE

This present application claims the benefit of priority to U.S. Provisional Application No. 63/241,481, "Segment based Compression Methods for Mesh Compression" filed on Sep. 7, 2021, which is incorporated by reference herein in its entirety.

TECHNICAL FIELD

The present disclosure describes embodiments generally related to mesh coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various technologies are developed to capture and represent the world, such as objects in the world, environments in the world, and the like in 3-dimensional (3D) space. 3D representations of the world can enable more immersive forms of interaction and communication. In some examples, point clouds and meshes can be used as 3D representations of the world.

SUMMARY

Aspects of the disclosure provide methods and apparatuses for mesh coding (e.g., compression and decompression). In some examples, an apparatus for mesh coding includes processing circuitry. The processing circuitry decodes, using a decoder supporting a first bitdepth, a plurality of segmental attribute values having the first bitdepth from a bitstream carrying a mesh that represents a surface of an object. The plurality of segmental attribute values is associated with attribute values of the mesh, the attribute values of the mesh have a second bitdepth that is higher than the first bitdepth. The processing circuitry determines the attribute values of the mesh having the second bitdepth according to the plurality of segmental attribute values of the first bitdepth.

According to an aspect of the disclosure, the plurality of segmental attribute values is associated with a first spatial segment of the mesh, a dynamic range of first attribute values in the first spatial segment of the mesh is representable by the first bitdepth. In some examples, the processing circuitry decodes a first anchor value associated with the first spatial segment from the bitstream, and determines the first attribute values in the first spatial segment by combining the first anchor value with the plurality of segmental attribute values. In an example, the processing circuitry adds the first anchor value with a segmental attribute value in the plurality of segmental attribute values to determine an attribute value in the first attribute values. In another example, the processing circuitry subtracts a segmental attribute value in the plurality of segmental attribute values from the first anchor value to determine an attribute value in the first attribute values.

In some examples, the processing circuitry decodes the first anchor value associated with the first spatial segment independently of other anchor values associated with other spatial segments. In some other examples, the processing circuitry determines the first anchor value associated with the first spatial segment at least partially based on another anchor value associated with another spatial segment.

According to another aspect of the disclosure, the plurality of segmental attribute values includes at least a first segmental attribute value corresponding to a first subset of bits for an attribute value of the second bitdepth and a second segmental attribute value corresponding to a second subset of bits for the attribute value of the second bitdepth. The processing circuitry concatenates the first subset of bits with the second subset of bits to determine the attribute value. In an example, the processing circuitry decodes a first plurality of segmental attribute values including the first segmental attribute value according to a first decoding configuration, and decodes, a second plurality of segmental attribute values including the second segmental attribute value according to a second decoding configuration that is different from the first decoding configuration.

Aspects of the disclosure also provide a non-transitory computer-readable medium storing instructions which when executed by a computer cause the computer to perform any one or a combination of the methods for mesh coding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
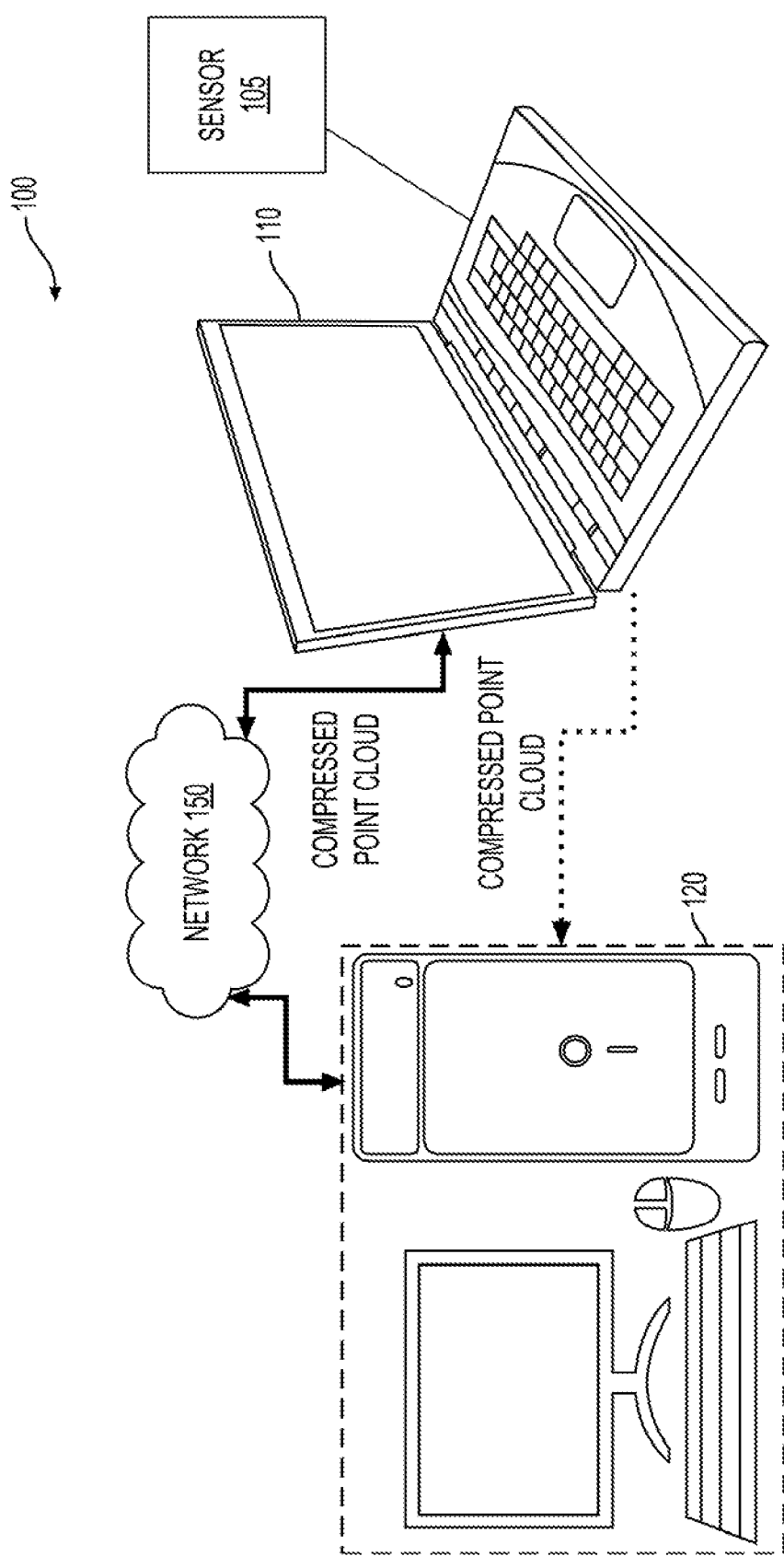
FIG. 1 shows a block diagram of a communication system in some examples.

Aspects of the disclosure provide techniques in the field of three dimensional (3D) media processing.

Technology developments in 3D media processing, such as advances in three dimensional (3D) capture, 3D modeling, and 3D rendering, and the like have promoted the ubiquitous presence of 3D media contents across several platforms and devices. In an example, a baby's first step can be captured in one continent, media technology can allow grandparents to view (and maybe interact) and enjoy an immersive experience with the baby in another continent. According to an aspect of the disclosure, in order to improve immersive experience, 3D models are becoming ever more sophisticated, and the creation and consumption of 3D models occupy a significant amount of data resources, such as data storage, data transmission resources.

According to some aspects of the disclosure, point clouds and meshes can be used as 3D models to represent immersive contents.

A point cloud generally may refer to a set of points in a 3D space, each with associated attributes, such as color, material properties, texture information, intensity attributes, reflectivity attributes, motion related attributes, modality attributes, and various other attributes. Point clouds can be used to reconstruct an object or a scene as a composition of such points.

A mesh (also referred to as mesh model) of an object can include polygons that describe the surface of the object. Each polygon can be defined by vertices of the polygon in 3D space and the information of how the vertices are connected into the polygon. The information of how the vertices are connected is referred to as connectivity information. In some examples, the mesh can also include attributes, such as color, normal, and the like, associated with the vertices.

According to some aspects of the disclosure, some coding tools for point cloud compression (PCC) can be used for mesh compression. For example, a mesh can be re-meshed to generate a new mesh that the connectivity information of the new mesh can be inferred. The vertices of the new mesh, and the attributes associated with the vertices of the new mesh can be considered as points in a point cloud and can be compressed using PCC codecs.

Point clouds can be used to reconstruct an object or a scene as a composition of such points. The points can be captured using multiple cameras, depth sensors or Lidar in various setups and may be made up of thousands up to billions of points in order to realistically represent reconstructed scenes or objects. A patch generally may refer to a contiguous subset of the surface described by the point cloud. In an example, a patch includes points with surface normal vectors that deviate from one another less than a threshold amount.

PCC can be performed according to various schemes, such as a geometry-based scheme that is referred to as G-PCC, a video coding based scheme that is referred to as V-PCC, and the like. According to some aspects of the disclosure, the G-PCC encodes the 3D geometry directly and is a purely geometry-based approach without much to share with video coding, and the V-PCC is heavily based on video coding. For example, V-PCC can map a point of the 3D cloud to a pixel of a 2D grid (an image). The V-PCC scheme can utilize generic video codecs for point cloud compression. A PCC codec (encoder/decoder) in the present disclosure can be G-PCC codec (encoder/decoder) or V-PCC codec.

According to an aspect of the disclosure, the V-PCC scheme can use existing video codecs to compress the geometry, occupancy, and texture of a point cloud as three separate video sequences. The extra metadata needed to interpret the three video sequences is compressed separately. A small portion of the overall bitstream is the metadata, which could be encoded/decoded efficiently using software implementation in an example. The bulk of the information is handled by the video codec.

FIG. 1 illustrates a block diagram of a communication system (100) in some examples. The communication system (100) includes a plurality of terminal devices that can communicate with each other, via, for example, a network (150). For example, the communication system (100) includes a pair of terminal devices (110) and (120) interconnected via the network (150). In the FIG. 1 example, the first pair of terminal devices (110) and (120) may perform unidirectional transmission of point cloud data. For example, the terminal device (110) may compress a point cloud (e.g., points representing a structure) that is captured by a sensor (105) connected with the terminal device (110). The compressed point cloud can be transmitted, for example in the form of a bitstream, to the other terminal device (120) via the network (150). The terminal device (120) may receive the compressed point cloud from the network (150), decompress the bitstream to reconstruct the point cloud, and suitably display the reconstructed point cloud. Unidirectional data transmission may be common in media serving applications and the like.

In the FIG. 1 example, the terminal devices (110) and (120) may be illustrated as servers, and personal computers, but the principles of the present disclosure may be not so limited. Embodiments of the present disclosure find application with laptop computers, tablet computers, smart phones, gaming terminals, media players, and/or dedicated three-dimensional (3D) equipment. The network (150) represents any number of networks that transmit compressed point cloud between the terminal devices (110) and (120). The network (150) can include for example wireline (wired) and/or wireless communication networks. The network (150) may exchange data in circuit-switched and/or packet-switched channels. Representative networks include telecommunications networks, local area networks, wide area networks, the Internet, and the like.

Figure 2:
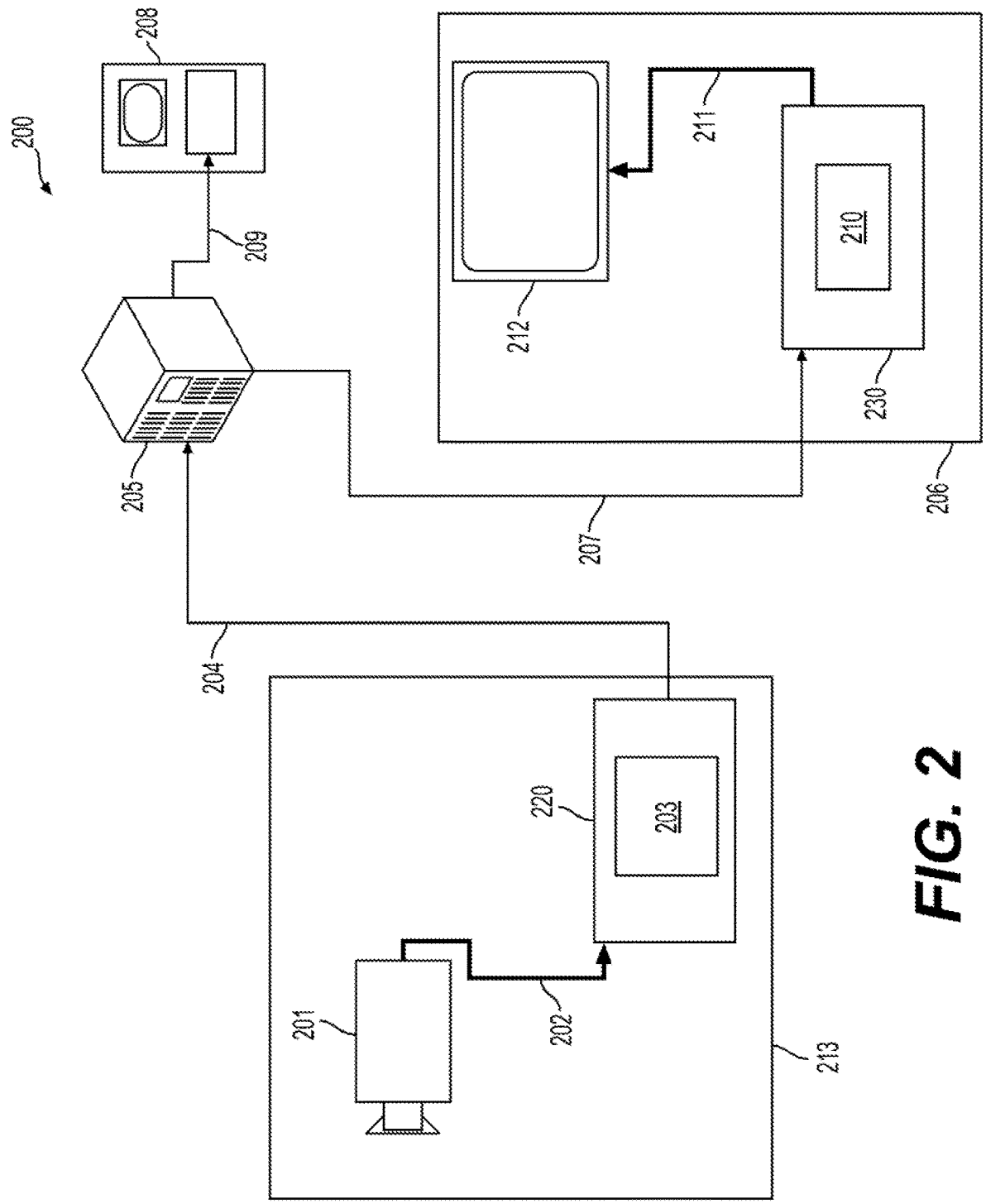
FIG. 2 shows a block diagram of a streaming system in some examples.

FIG. 2 illustrates a block diagram of a streaming system (200) in some examples. The streaming system (200) is a use application of point cloud. The disclosed subject matter can be equally applicable to other point cloud enabled applications, such as, 3D telepresence application, virtual reality application, and the like.

The streaming system (200) may include a capture subsystem (213). The capture subsystem (213) can include a point cloud source (201), for example light detection and ranging (LIDAR) systems, 3D cameras, 3D scanners, a graphics generation component that generates the uncompressed point cloud in software, and the like that generates for example point clouds (202) that are uncompressed. In an example, the point clouds (202) include points that are captured by the 3D cameras. The point clouds (202), depicted as a bold line to emphasize a high data volume when compared to compressed point clouds (204) (a bitstream of compressed point clouds). The compressed point clouds (204) can be generated by an electronic device (220) that includes an encoder (203) coupled to the point cloud source (201). The encoder (203) can include hardware, software, or a combination thereof to enable or implement aspects of the disclosed subject matter as described in more detail below. The compressed point clouds (204) (or bitstream of compressed point clouds (204)), depicted as a thin line to emphasize the lower data volume when compared to the stream of point clouds (202), can be stored on a streaming server (205) for future use. One or more streaming client subsystems, such as client subsystems (206) and (208) in FIG. 2 can access the streaming server (205) to retrieve copies (207) and (209) of the compressed point cloud (204). A client subsystem (206) can include a decoder (210), for example, in an electronic device (230). The decoder (210) decodes the incoming copy (207) of the compressed point clouds and creates an outgoing stream of reconstructed point clouds (211) that can be rendered on a rendering device (212).

It is noted that the electronic devices (220) and (230) can include other components (not shown). For example, the electronic device (220) can include a decoder (not shown) and the electronic device (230) can include an encoder (not shown) as well.

In some streaming systems, the compressed point clouds (204), (207), and (209) (e.g., bitstreams of compressed point clouds) can be compressed according to certain standards. In some examples, video coding standards are used in the compression of point clouds. Examples of those standards include, High Efficiency Video Coding (HEVC), Versatile Video Coding (VVC), and the like.

Figure 3:
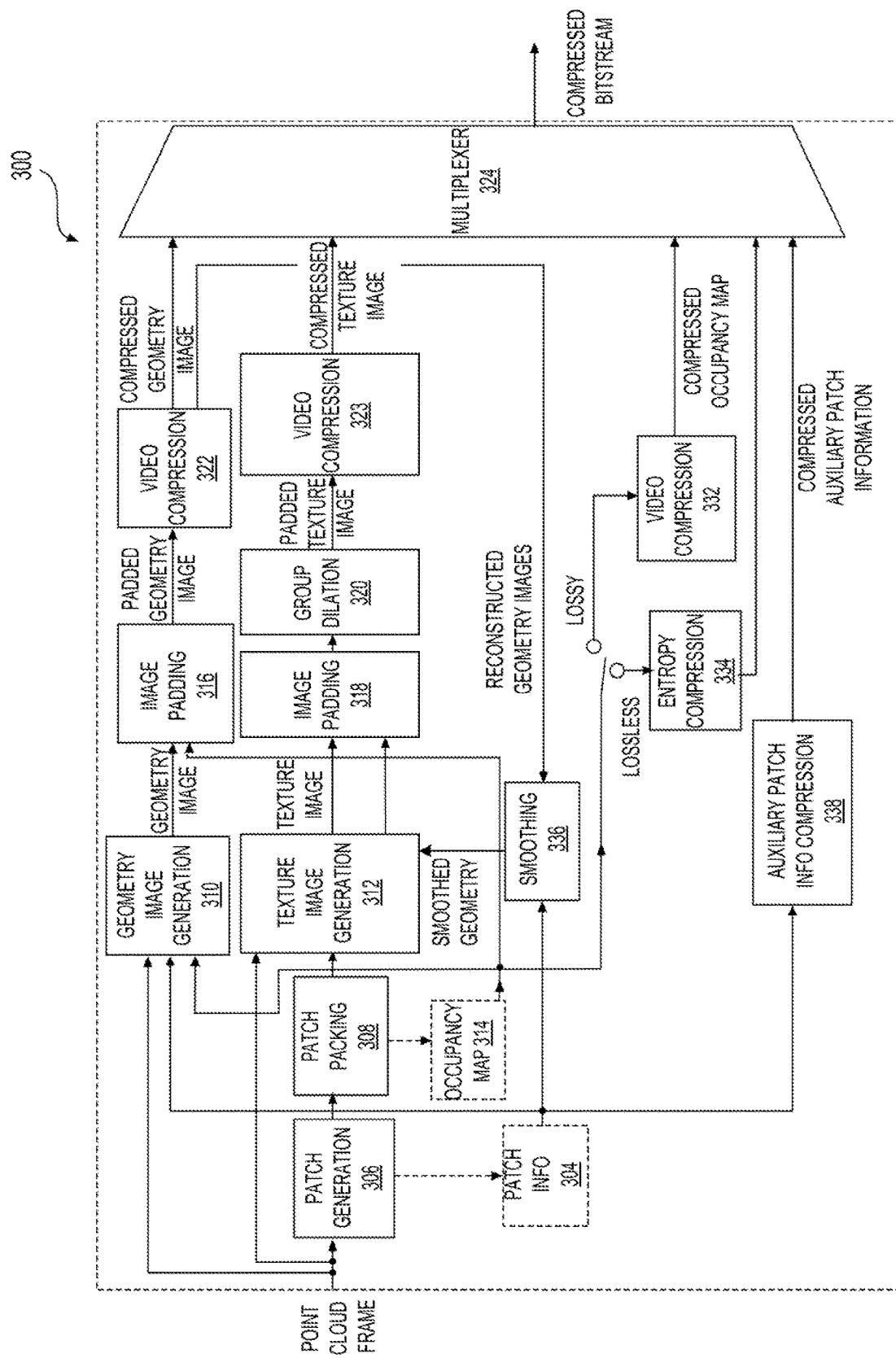
FIG. 3 shows a block diagram of an encoder for encoding point cloud frames in some examples.

FIG. 3 shows a block diagram of a V-PCC encoder (300) for encoding point cloud frames, according to some embodiments. In some embodiments, the V-PCC encoder (300) can be used in the communication system (100) and streaming system (200). For example, the encoder (203) can be configured and operate in a similar manner as the V-PCC encoder (300).

The V-PCC encoder (300) receives point cloud frames as uncompressed inputs and generates bitstream corresponding to compressed point cloud frames. In some embodiments, the V-PCC encoder (300) may receive the point cloud frames from a point cloud source, such as the point cloud source (201) and the like.

In the FIG. 3 example, the V-PCC encoder (300) includes a patch generation module (306), a patch packing module (308), a geometry image generation module (310), a texture image generation module (312), a patch info module (304), an occupancy map module (314), a smoothing module (336), image padding modules (316) and (318), a group dilation module (320), video compression modules (322), (323) and (332), an auxiliary patch info compression module (338), an entropy compression module (334), and a multiplexer (324).

According to an aspect of the disclosure, the V-PCC encoder (300), converts 3D point cloud frames into image-based representations along with some metadata (e.g., occupancy map and patch info) that is used to convert the compressed point cloud back into a decompressed point cloud. In some examples, the V-PCC encoder (300) can convert 3D point cloud frames into geometry images, texture images and occupancy maps, and then use video coding techniques to encode the geometry images, texture images and occupancy maps into a bitstream. Generally, a geometry image is a 2D image with pixels filled with geometry values associated with points projected to the pixels, and a pixel filled with a geometry value can be referred to as a geometry sample. A texture image is a 2D image with pixels filled with texture values associated with points projected to the pixels, and a pixel filled with a texture value can be referred to as a texture sample. An occupancy map is a 2D image with pixels filled with values that indicate occupied or unoccupied by patches.

The patch generation module (306) segments a point cloud into a set of patches (e.g., a patch is defined as a contiguous subset of the surface described by the point cloud), which may be overlapping or not, such that each patch may be described by a depth field with respect to a plane in 2D space. In some embodiments, the patch generation module (306) aims at decomposing the point cloud into a minimum number of patches with smooth boundaries, while also minimizing the reconstruction error.

In some examples, the patch info module (304) can collect the patch information that indicates sizes and shapes of the patches. In some examples, the patch information can be packed into an image frame and then encoded by the auxiliary patch info compression module (338) to generate the compressed auxiliary patch information.

In some examples, the patch packing module (308) is configured to map the extracted patches onto a 2 dimensional (2D) grid while minimize the unused space and guarantee that every M×M (e.g., 16×16) block of the grid is associated with a unique patch. Efficient patch packing can directly impact the compression efficiency either by minimizing the unused space or ensuring temporal consistency.

The geometry image generation module (310) can generate 2D geometry images associated with geometry of the point cloud at given patch locations. The texture image generation module (312) can generate 2D texture images associated with texture of the point cloud at given patch locations. The geometry image generation module (310) and the texture image generation module (312) exploit the 3D to 2D mapping computed during the packing process to store the geometry and texture of the point cloud as images. In order to better handle the case of multiple points being projected to the same sample, each patch is projected onto two images, referred to as layers. In an example, geometry image is represented by a monochromatic frame of W×H in YUV420-8 bit format. To generate the texture image, the texture generation procedure exploits the reconstructed/smoothed geometry in order to compute the colors to be associated with the re-sampled points.

The occupancy map module (314) can generate an occupancy map that describes padding information at each unit. For example, the occupancy image includes a binary map that indicates for each cell of the grid whether the cell belongs to the empty space or to the point cloud. In an example, the occupancy map uses binary information describing for each pixel whether the pixel is padded or not. In another example, the occupancy map uses binary information describing for each block of pixels whether the block of pixels is padded or not.

The occupancy map generated by the occupancy map module (314) can be compressed using lossless coding or lossy coding. When lossless coding is used, the entropy compression module (334) is used to compress the occupancy map. When lossy coding is used, the video compression module (332) is used to compress the occupancy map.

It is noted that the patch packing module (308) may leave some empty spaces between 2D patches packed in an image frame. The image padding modules (316) and (318) can fill the empty spaces (referred to as padding) in order to generate an image frame that may be suited for 2D video and image codecs. The image padding is also referred to as background filling which can fill the unused space with redundant information. In some examples, a good background filling minimally increases the bit rate while does not introduce significant coding distortion around the patch boundaries.

The video compression modules (322), (323), and (332) can encode the 2D images, such as the padded geometry images, padded texture images, and occupancy maps based on a suitable video coding standard, such as HEVC, VVC and the like. In an example, the video compression modules (322), (323), and (332) are individual components that operate separately. It is noted that the video compression modules (322), (323), and (332) can be implemented as a single component in another example.

In some examples, the smoothing module (336) is configured to generate a smoothed image of the reconstructed geometry image. The smoothed image can be provided to the texture image generation (312). Then, the texture image generation (312) may adjust the generation of the texture image based on the reconstructed geometry images. For example, when a patch shape (e.g. geometry) is slightly distorted during encoding and decoding, the distortion may be taken into account when generating the texture images to correct for the distortion in patch shape.

In some embodiments, the group dilation (320) is configured to pad pixels around the object boundaries with redundant low-frequency content in order to improve coding gain as well as visual quality of reconstructed point cloud.

The multiplexer (324) can multiplex the compressed geometry image, the compressed texture image, the compressed occupancy map, the compressed auxiliary patch information into a compressed bitstream.

Figure 4:
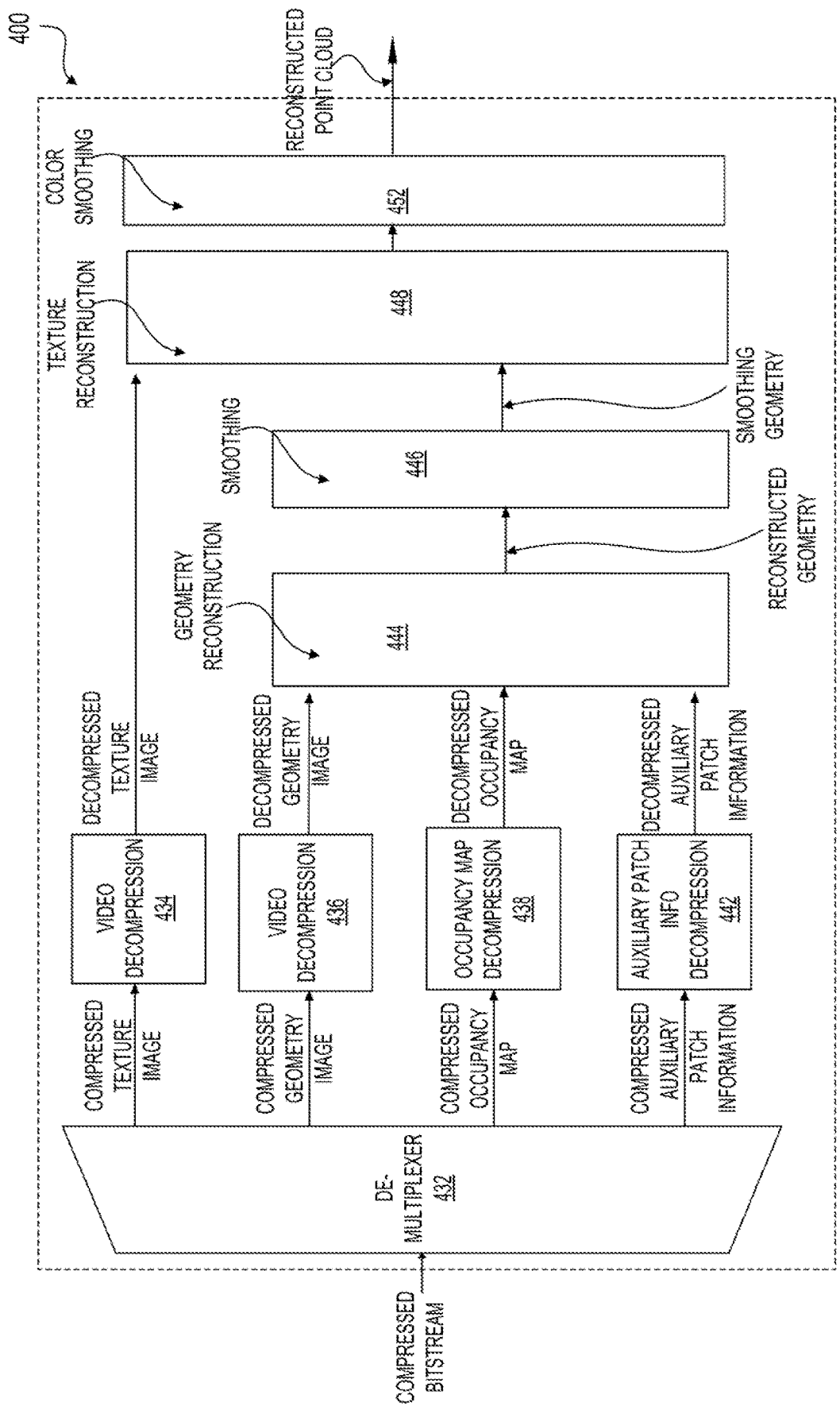
FIG. 4 shows a block diagram of a decoder for decoding a compressed bitstream corresponding to point cloud frames in some examples.

FIG. 4 shows a block diagram of a V-PCC decoder (400) for decoding compressed bitstream corresponding to point cloud frames, in some examples. In some examples, the V-PCC decoder (400) can be used in the communication system (100) and streaming system (200). For example, the decoder (210) can be configured to operate in a similar manner as the V-PCC decoder (400). The V-PCC decoder (400) receives the compressed bitstream, and generates reconstructed point cloud based on the compressed bitstream.

In the FIG. 4 example, the V-PCC decoder (400) includes a de-multiplexer (432), video decompression modules (434) and (436), an occupancy map decompression module (438), an auxiliary patch-information decompression module (442), a geometry reconstruction module (444), a smoothing module (446), a texture reconstruction module (448), and a color smoothing module (452).

The de-multiplexer (432) can receive and separate the compressed bitstream into compressed texture image, compressed geometry image, compressed occupancy map, and compressed auxiliary patch information.

The video decompression modules (434) and (436) can decode the compressed images according to a suitable standard (e.g., HEVC, VVC, etc.) and output decompressed images. For example, the video decompression module (434) decodes the compressed texture images and outputs decompressed texture images; and the video decompression module (436) decodes the compressed geometry images and outputs the decompressed geometry images.

The occupancy map decompression module (438) can decode the compressed occupancy maps according to a suitable standard (e.g., HEVC, VVC, etc.) and output decompressed occupancy maps.

The auxiliary patch-information decompression module (442) can decode the compressed auxiliary patch information according to a suitable standard (e.g., HEVC, VVC, etc.) and output decompressed auxiliary patch information.

The geometry reconstruction module (444) can receive the decompressed geometry images, and generate reconstructed point cloud geometry based on the decompressed occupancy map and decompressed auxiliary patch information.

The smoothing module (446) can smooth incongruences at edges of patches. The smoothing procedure aims at alleviating potential discontinuities that may arise at the patch boundaries due to compression artifacts. In some embodiments, a smoothing filter may be applied to the pixels located on the patch boundaries to alleviate the distortions that may be caused by the compression/decompression.

The texture reconstruction module (448) can determine texture information for points in the point cloud based on the decompressed texture images and the smoothing geometry.

The color smoothing module (452) can smooth incongruences of coloring. Non-neighboring patches in 3D space are often packed next to each other in 2D videos. In some examples, pixel values from non-neighboring patches might be mixed up by the block-based video codec. The goal of color smoothing is to reduce the visible artifacts that appear at patch boundaries.

Figure 5:
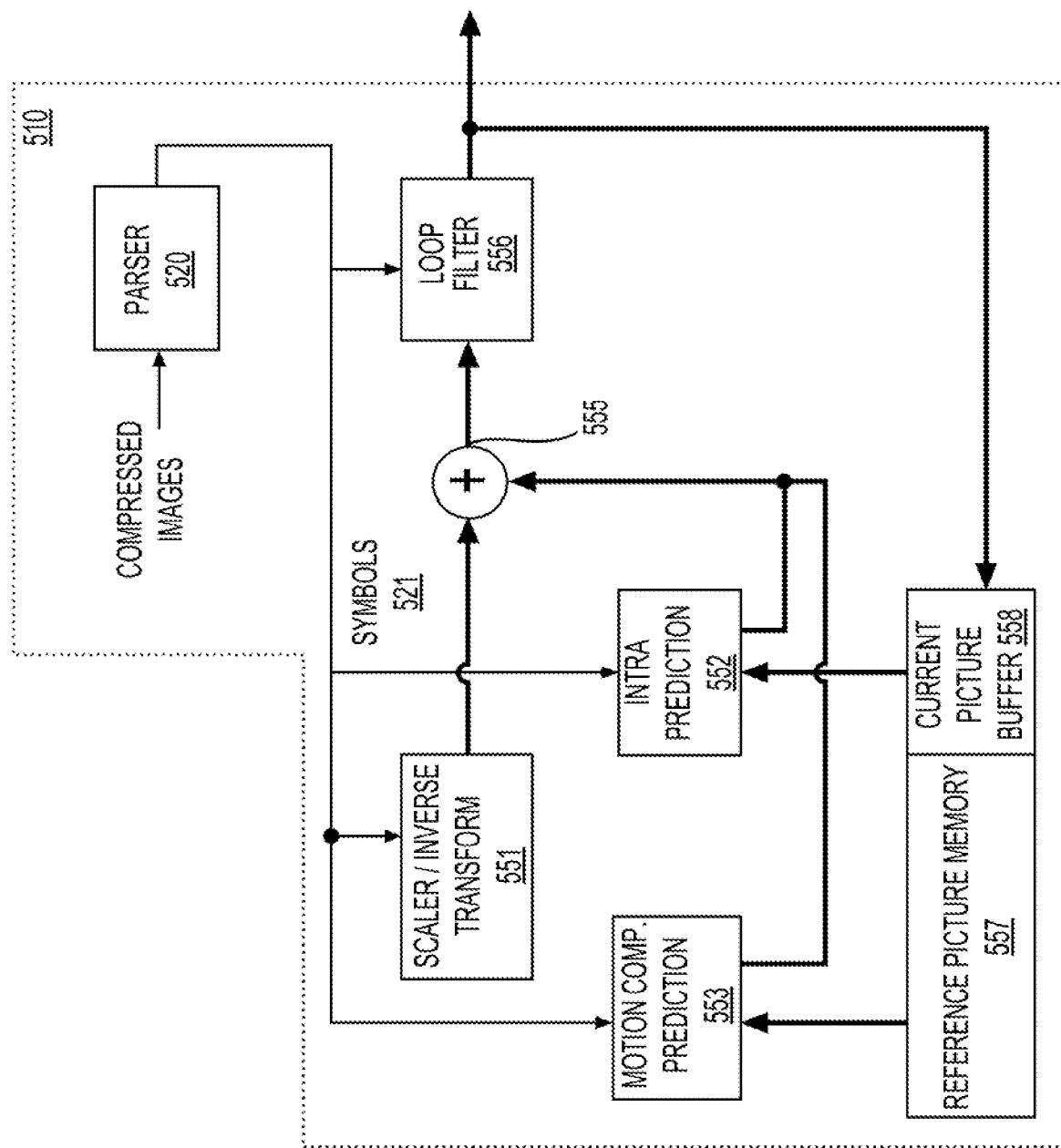
FIG. 5 shows a block diagram of a video decoder in some examples.

FIG. 5 shows a block diagram of a video decoder (510) in some examples. The video decoder (510) can be used in the V-PCC decoder (400). For example, the video decompression modules (434) and (436), the occupancy map decompression module (438) can be similarly configured as the video decoder (510).

The video decoder (510) may include a parser (520) to reconstruct symbols (521) from compressed images, such as the coded video sequence. Categories of those symbols include information used to manage operation of the video decoder (510). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from a buffer memory, so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to a render device as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 6:
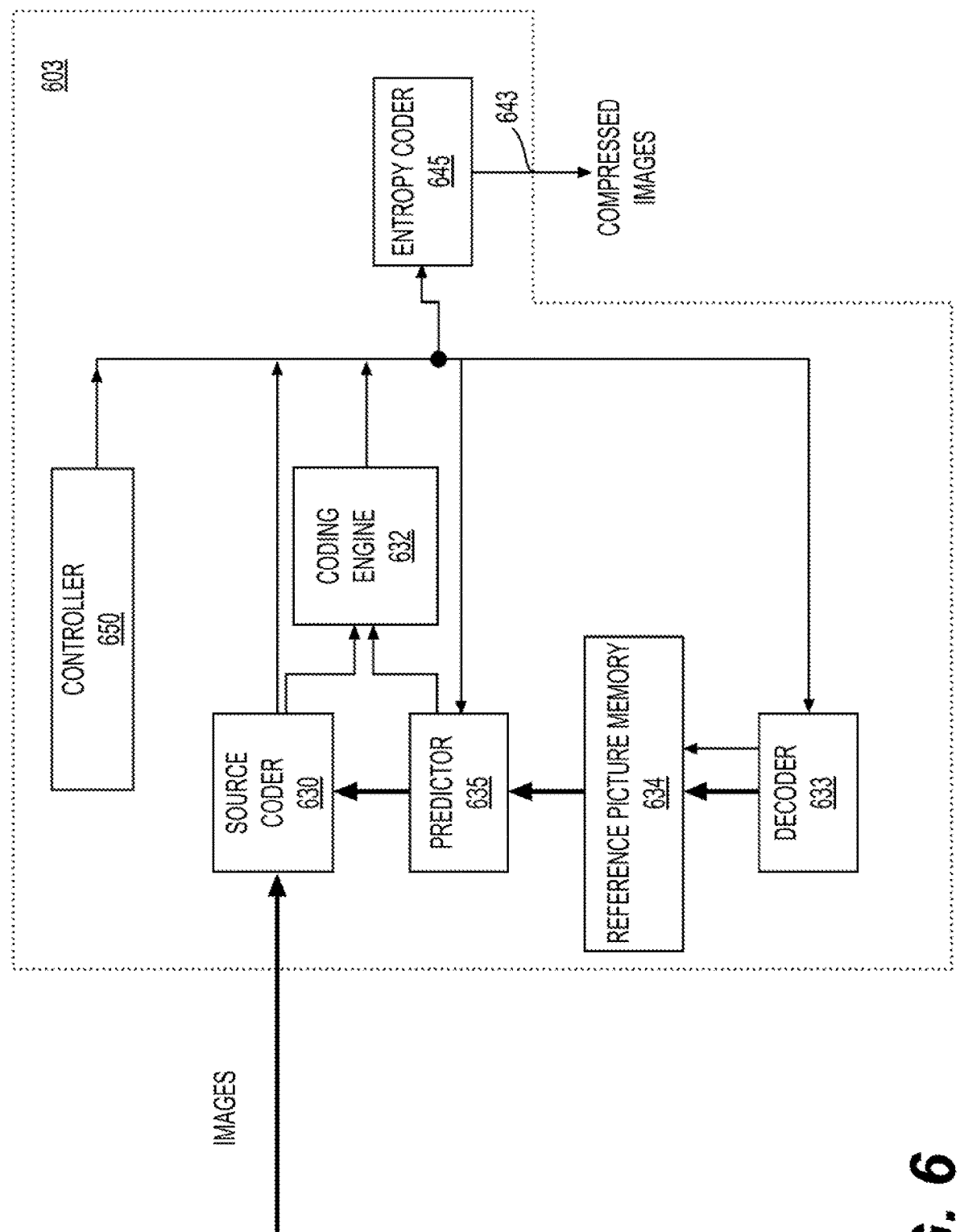
FIG. 6 shows a block diagram of a video encoder in some examples.

FIG. 6 shows a block diagram of a video encoder (603) according to an embodiment of the present disclosure. The video encoder (603) can be used in the V-PCC encoder (300) that compresses point clouds. In an example, the video compression module (322) and (323), and the video compression module (332) are configured similarly to the encoder (603).

The video encoder (603) may receive images, such as padded geometry images, padded texture images and the like, and generate compressed images.

According to an embodiment, the video encoder (603) may code and compress the pictures of the source video sequence (images) into a coded video sequence (compressed images) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including and parser (520) may not be fully implemented in the local decoder (633).

During operation, in some examples, the source coder (630) may perform motion compensated predictive coding, which codes an input picture predictively with reference to one or more previously-coded picture from the video sequence that were designated as "reference pictures". In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

A video may be in the form of a plurality of source pictures (images) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
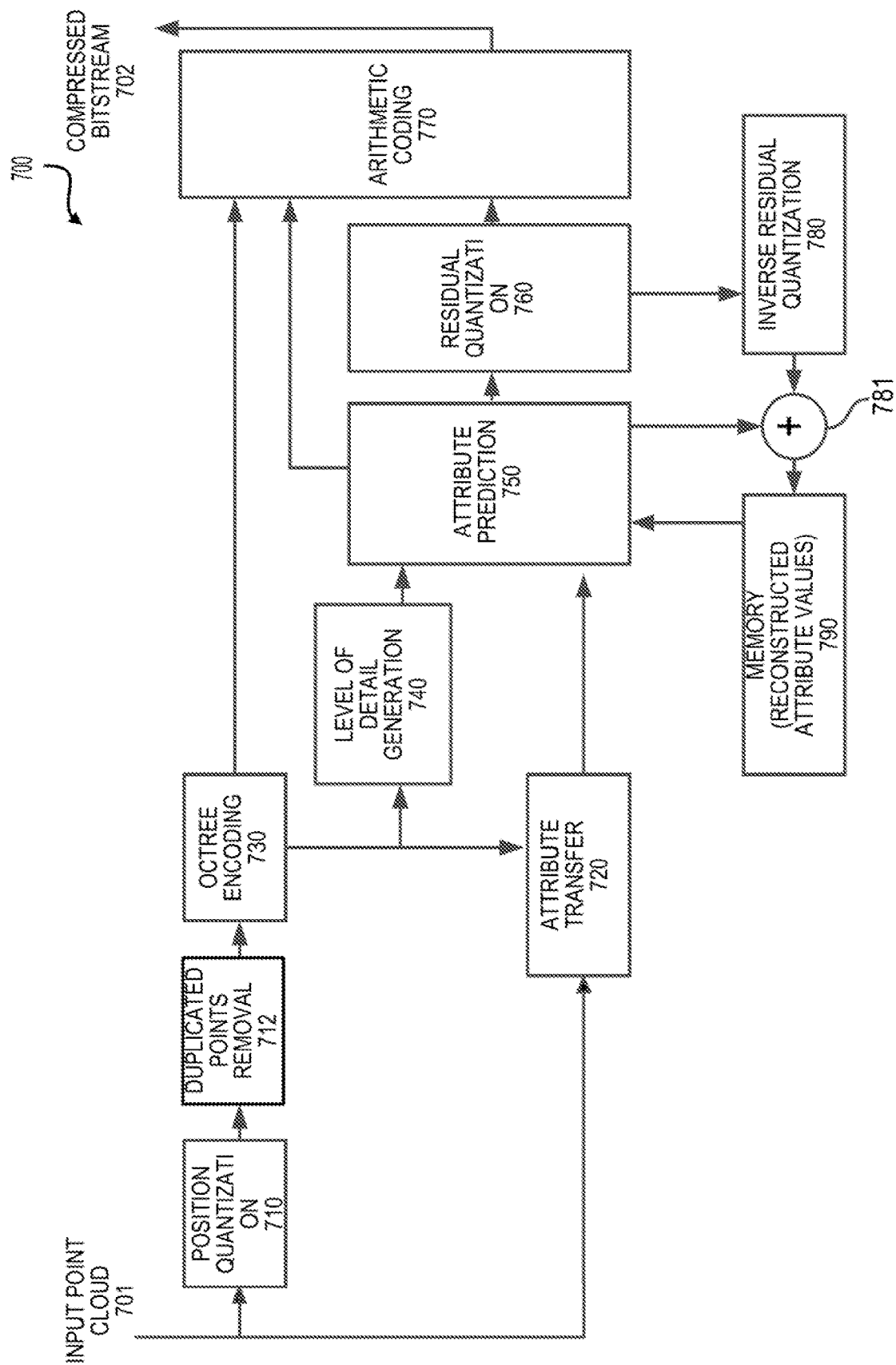
FIG. 7 shows a block diagram of an encoder for encoding point cloud frames, in some examples.

FIG. 7 shows a block diagram of a G-PCC encoder (700) in some examples. The G-PCC encoder (700) can be configured to receive point cloud data and compress the point cloud data to generate a bit stream carrying compressed point cloud data. In an embodiment, the G-PCC encoder (700) can include a position quantization module (710), a duplicated points removal module (712), an octree encoding module (730), an attribute transfer module (720), a level of detail (LOD) generation module (740), an attribute prediction module (750), a residual quantization module (760), an arithmetic coding module (770), an inverse residual quantization module (780), an addition module (781), and a memory (790) to store reconstructed attribute values.

As shown, an input point cloud (701) can be received at the G-PCC encoder (700). Positions (e.g., 3D coordinates) of the point cloud (701) are provided to the quantization module (710). The quantization module (710) is configured to quantize the coordinates to generate quantized positions. The duplicated points removal module (712) is configured to receive the quantized positions and perform a filter process to identify and remove duplicated points. The octree encoding module (730) is configured to receive filtered positions from the duplicated points removal module (712), and perform an octree-based encoding process to generate a sequence of occupancy codes that describe a 3D grid of voxels. The occupancy codes are provided to the arithmetic coding module (770).

The attribute transfer module (720) is configured to receive attributes of the input point cloud, and perform an attribute transfer process to determine an attribute value for each voxel when multiple attribute values are associated with the respective voxel. The attribute transfer process can be performed on the re-ordered points output from the octree encoding module (730). The attributes after the transfer operations are provided to the attribute prediction module (750). The LOD generation module (740) is configured to operate on the re-ordered points output from the octree encoding module (730), and re-organize the points into different LODs. LOD information is supplied to the attribute prediction module (750).

The attribute prediction module (750) processes the points according to an LOD-based order indicated by the LOD information from the LOD generation module (740). The attribute prediction module (750) generates an attribute prediction for a current point based on reconstructed attributes of a set of neighboring points of the current point stored in the memory (790). Prediction residuals can subsequently be obtained based on original attribute values received from the attribute transfer module (720) and locally generated attribute predictions. When candidate indices are used in the respective attribute prediction process, an index corresponding to a selected prediction candidate may be provided to the arithmetic coding module (770).

The residual quantization module (760) is configured to receive the prediction residuals from the attribute prediction module (750), and perform quantization to generate quantized residuals. The quantized residuals are provided to the arithmetic coding module (770).

The inverse residual quantization module (780) is configured to receive the quantized residuals from the residual quantization module (760), and generate reconstructed prediction residuals by performing an inverse of the quantization operations performed at the residual quantization module (760). The addition module (781) is configured to receive the reconstructed prediction residuals from the inverse residual quantization module (780), and the respective attribute predictions from the attribute prediction module (750). By combining the reconstructed prediction residuals and the attribute predictions, the reconstructed attribute values are generated and stored to the memory (790).

The arithmetic coding module (770) is configured to receive the occupancy codes, the candidate indices (if used), the quantized residuals (if generated), and other information, and perform entropy encoding to further compress the received values or information. As a result, a compressed bitstream (702) carrying the compressed information can be generated. The bitstream (702) may be transmitted, or otherwise provided, to a decoder that decodes the compressed bitstream, or may be stored in a storage device.

Figure 8:
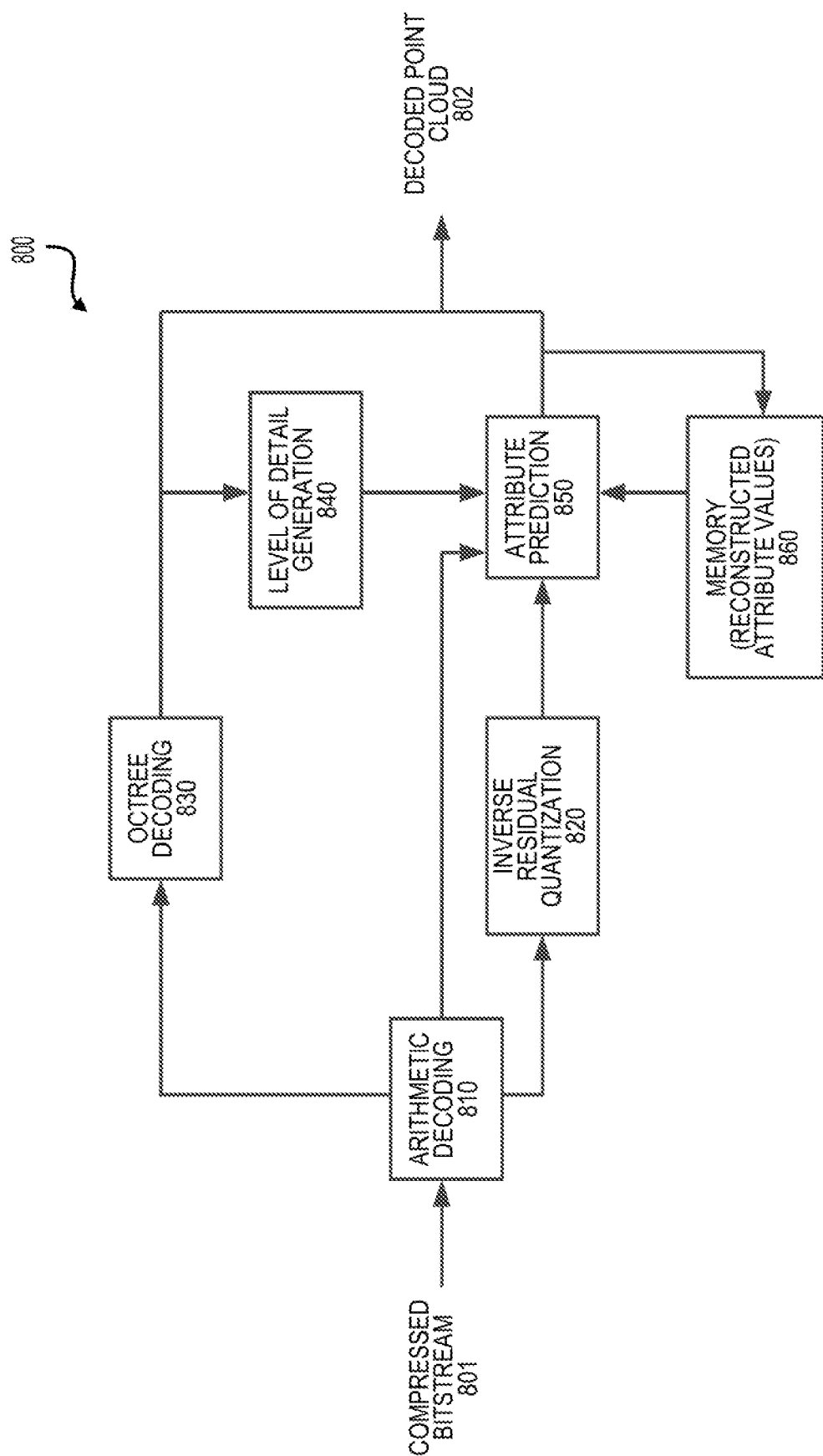
FIG. 8 shows a block diagram of a decoder for decoding a compressed bitstream corresponding to point cloud frames in some examples.

FIG. 8 shows a block diagram of a G-PCC decoder (800) in accordance with an embodiment. The G-PCC decoder (800) can be configured to receive a compressed bitstream and perform point cloud data decompression to decompress the bitstream to generate decoded point cloud data. In an embodiment, the G-PCC decoder (800) can include an arithmetic decoding module (810), an inverse residual quantization module (820), an octree decoding module (830), an LOD generation module (840), an attribute prediction module (850), and a memory (860) to store reconstructed attribute values.

As shown, a compressed bitstream (801) can be received at the arithmetic decoding module (810). The arithmetic decoding module (810) is configured to decode the compressed bitstream (801) to obtain quantized residuals (if generated) and occupancy codes of a point cloud. The octree decoding module (830) is configured to determine reconstructed positions of points in the point cloud according to the occupancy codes. The LOD generation module (840) is configured to re-organize the points into different LODs based on the reconstructed positions, and determine an LOD-based order. The inverse residual quantization module (820) is configured to generate reconstructed residuals based on the quantized residuals received from the arithmetic decoding module (810).

The attribute prediction module (850) is configured to perform an attribute prediction process to determine attribute predictions for the points according to the LOD-based order. For example, an attribute prediction of a current point can be determined based on reconstructed attribute values of neighboring points of the current point stored in the memory (860). In some examples, the attribute prediction can be combined with a respective reconstructed residual to generate a reconstructed attribute for the current point.

A sequence of reconstructed attributes generated from the attribute prediction module (850) together with the reconstructed positions generated from the octree decoding module (830) corresponds to a decoded point cloud (802) that is output from the G-PCC decoder (800) in one example. In addition, the reconstructed attributes are also stored into the memory (860) and can be subsequently used for deriving attribute predictions for subsequent points.

In various embodiments, the encoder (300), the decoder (400), the encoder (700), and/or the decoder (800) can be implemented with hardware, software, or combination thereof. For example, the encoder (300), the decoder (400), the encoder (700), and/or the decoder (800) can be implemented with processing circuitry such as one or more integrated circuits (ICs) that operate with or without software, such as an application specific integrated circuit (ASIC), field programmable gate array (FPGA), and the like. In another example, the encoder (300), the decoder (400), the encoder (700), and/or the decoder (800) can be implemented as software or firmware including instructions stored in a non-volatile (or non-transitory) computer-readable storage medium. The instructions, when executed by processing circuitry, such as one or more processors, causing the processing circuitry to perform functions of the encoder (300), the decoder (400), the encoder (700), and/or the decoder (800).

It is noted that the attribute prediction modules (750) and (850) configured to implement the attribute prediction techniques disclosed herein can be included in other decoders or encoders that may have similar or different structures from what is shown in FIG. 7 and FIG. 8. In addition, the encoder (700) and decoder (800) can be included in a same device, or separate devices in various examples.

According to some aspects of the disclosure, mesh compression can use coding tools different from PCC coding tools or can use PCC coding tools, such as above PCC (e.g., G-PCC, V-PCC) encoders, above PCC (e.g., G-PCC, V-PCC) decoders, and the like.

A mesh (also referred to as mesh model, or 3D mesh) of an object can include polygons that describe the surface of the object. Each polygon can be defined by vertices of the polygon in 3D space and the information of how the vertices are connected into the polygon. The information of how the vertices are connected is referred to as connectivity information. In some examples, the mesh can also include attributes, such as color, normal, and the like, associated with the vertices. The attributes can be associated with the surface of the mesh by exploiting mapping information that parameterizes the mesh with 2D attribute maps. The mapping information is usually described by a set of parametric coordinates, referred to as UV coordinates or texture coordinates, associated with the mesh vertices. 2D attribute maps (referred to as texture maps in some examples) are used to store high resolution attribute information such as texture, normals, displacements etc. Such information could be used for various purposes such as texture mapping and shading.

In some embodiments, a mesh can include components that are referred to as geometry information, connectivity information, mapping information, vertex attributes, and attribute maps. In some examples, the geometry information is described by a set of 3D positions associated with the vertices of the mesh. In an example, (x,y,z) coordinates can be used to describe the 3D positions of the vertices. In some examples, the connectivity information includes a set of vertex indices that describes how to connect the vertices to create a 3D surface. In some examples, the mapping information describes how to map the mesh surface to 2D regions of the plane. In an example, the mapping information is described by a set of UV parametric/texture coordinates (u,v) associated with the mesh vertices together with the connectivity information. In some examples, the vertex attributes include scalar or vector attribute values associated with the mesh vertices. In some examples, attribute maps include attributes that are associated with the mesh surface and are stored as 2D images/videos. In an example, the mapping between the videos (e.g., 2D images/videos) and the mesh surface is defined by the mapping information.

According to an aspect of the disclosure, some techniques that are referred to as UV mapping or mesh parameterization are used to map surfaces of a mesh in the 3D domain to 2D domain. In some examples, a mesh is partitioned into patches in the 3D domain. Then, the patches are parameterized respectively into 2D shapes. The 2D shapes can be packed (e.g., oriented and placed) into maps that are also referred to as atlases in some examples. In some examples, the maps can be further processed using 2D image or video processing techniques.

In an example, a UV mapping technique generates a UV atlas (also referred to as UV map) and one or more texture atlas (also referred to as texture map) in 2D corresponding to patches of a 3D mesh. The UV atlas includes assignments of 3D vertices of the 3D mesh to 2D points in a 2D domain (e.g., a rectangular). The UV atlas is a mapping between coordinates of the 3D surface to coordinates of 2D domain. In an example, a point in the UV atlas at a 2D coordinates (u,v) has a value that is formed by coordinates (x, y, z) of a vertex in the 3D domain. In an example, a texture atlas includes color information of the 3D mesh. For example, a point in the texture atlas at the 2D coordinates (u,v) (which has a 3D value of (x,y,z) in the UV atlas) has a color that specifies the color attribute of a point at (x, y, z) in the 3D domain.

According to an aspect of the disclosure, a dynamic mesh is a mesh where at least one of the components (geometry information, connectivity information, mapping information, vertex attributes and attribute maps) varies with time. A dynamic mesh can be described by a sequence of meshes (also referred to as mesh frames). The dynamic mesh may require a large amount of data since the dynamic mesh may include a significant amount of information changing over time. Compression technologies of meshes can allow efficient storage and transmission of media contents in the mesh representation.

In some examples, a dynamic mesh can have constant connectivity information, time varying geometry and time varying vertex attributes. In some examples, a dynamic mesh can have time varying connectivity information. In an example, digital content creation tools usually generate dynamic meshes with time varying attribute maps and time varying connectivity information. In some examples, volumetric acquisition techniques are used to generate dynamic meshes. The volumetric acquisition techniques can generate a dynamic mesh with time varying connectivity information especially under real time constraints.

According to some aspects of the disclosure, mesh compression can be performed by representing a mesh using one or more 2D maps (referred to as attribute maps in some examples), and then encoding the 2D maps using image or video codecs. In some examples, re-meshing techniques, such as UV atlas sampling technique, are used in mesh compression. The UV atlas sampling technique re-meshes 3D mesh models via regular grid points sampled on the UV atlas. The original vertices in the UV atlas are replaced by regular grid points. The connectivity information can be inferred from the regular grid points and doesn't need to be separately encoded.

In some examples, using the UV atlas sampling technique, a mesh is represented by a plurality of maps, such as a geometry map (also referred to as UV atlas), color maps (also referred to as color atlases), texture maps (also referred to as texture atlases), an occupancy map and the like. In some examples, the plurality of maps are referred to as attribute maps, and values of samples in the attribute maps are referred to as attribute values. To encode the plurality of maps, image and/or video codecs can be used to achieve compression purpose. According to an aspect of the disclosure, the dynamic range of samples in one or more of the plurality of maps may exceed the capacity of some existing codecs. For example, some video codecs can only support 8-bit coding, while the bitdepth of a geometry map can be 10 bit, 12 bit or even 16 bit.

Some aspects of the disclosure provide techniques to allow image and/or video codec that supports a lower bitdepth (e.g., a generic video codec) to encode/decode 2D maps of a higher bitdepth, such as the attribute maps that are used to represent a mesh. Therefore, the attribute maps can be encoded or decoded by generic video codecs, and thus more devices can participate in applications that includes 3D mesh processing. It is noted that the techniques can be applied individually or by any form of combinations. Also, the techniques can be applied to a static mesh that includes only one mesh frame, and can be applied to a dynamic mesh that includes multiple mesh frames changing over time. It is noted that while video encoders and decoders are described to illustrate coding techniques for mesh in some examples, the illustrated coding techniques can be applied to image encoders and decoders for mesh compression/decompression in some examples.

Figure 9:
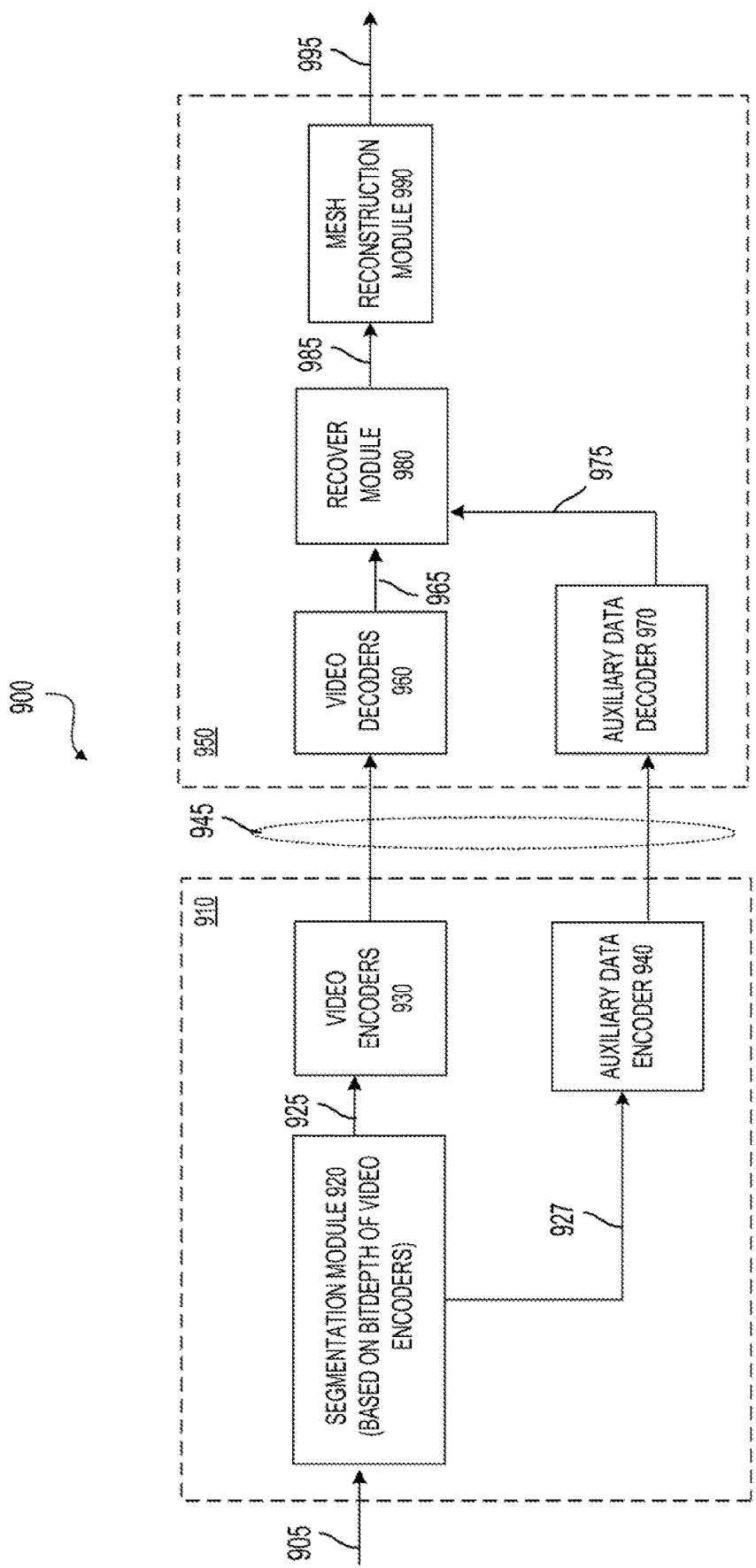
FIG. 9 shows a block diagram of a mesh coding framework in some examples.

FIG. 9 shows a diagram of a framework (900) for mesh compression according to some embodiments of the disclosure. The framework (900) includes a mesh encoder (910) and a mesh decoder (950). The mesh encoder (910) encodes an input mesh (905) (a mesh frame in case of a dynamic mesh processing) into a bitstream (945), and the mesh decoder (950) decodes the bitstream (945) to generate a reconstructed mesh (995) (a reconstructed mesh frame in case of a dynamic mesh processing).

The mesh encoder (910) can be any suitable device, such as a computer, a server computer, a desktop computer, a laptop computer, a tablet computer, a smart phone, a gaming device, an AR device, a VR device, and the like. The mesh decoder (950) can be any suitable device, such as a computer, a client computer, a desktop computer, a laptop computer, a tablet computer, a smart phone, a gaming device, an AR device, a VR device, and the like. The bitstream (945) can be transmitted from the mesh encoder (910) to the mesh decoder (950) via any suitable communication network (not shown).

In the FIG. 9 example, the mesh encoder (910) includes a segmentation module (920), video encoders (930) and an auxiliary data encoder (940) coupled together. The video encoders (930) are configured to process image or video data of a first bitdepth, such as 8 bitdepth in an example. The segmentation module (920) receives the input mesh (905) and detects that attributes values in a map for representing the input mesh (905) have a second bitdepth (e.g., 10 bitdepth, 12 bitdepth, 16 bitdepth, and the like) that is higher than the first bitdepth supported by the video encoders (930). The segmentation module (920) determines segmental attribute values of the first bitdepth from the attribute values of the second bitdepth.

The video encoders (930) can encode the segmental attribute values into the bitstream (945) using the image encoding and/or video encoding techniques.

The segmentation module (920) also generates auxiliary data (927) that indicates assistance information used for generating the segmental attribute values of the first bitdepth from the attribute values of the second bitdepth. The auxiliary data encoder (940) receives the auxiliary data (927), and encodes the auxiliary data (927) into the bitstream (945).

The operations of the segmentation module (920) and the auxiliary data encoder (940) will be further described in the present disclosure.

In the FIG. 9 example, the bitstream (945) is provided to the mesh decoder (950). The mesh decoder (950) includes video decoders (960), an auxiliary data decoder (970), a recover module (980), and a mesh reconstruction module (990) coupled together as shown in FIG. 9. In an example, the video decoders (960) correspond the video encoders (930), and can decode a portion of the bitstream (945) that is encoded by the video encoder (930) and generate decoded information (965).

In the FIG. 9 example, the auxiliary data decoder (970) corresponds the auxiliary data encoder (940), and can decode a portion of the bitstream (945) that is encoded by the auxiliary data encoder (940) and generate decoded auxiliary data (975).

In the FIG. 9 example, the decoded information (965) and the decoded auxiliary data (975) are provided to the recover module (980). The recover module (980) can form recovered attribute values (985) in the second bitdepth (higher bitdepth). The mesh reconstruction module (990) generates the reconstructed mesh (995) based on the recovered attribute values (985). The operations of the auxiliary data decoder (970) and the recover module (980) will be further described in the present disclosure.

It is noted that components in the mesh encoder (910), such as the segmentation module (920), the video encoders (930) and the auxiliary data encoder (940) can be respectively implemented by various techniques. In an example, a component is implemented by integrated circuitry. In another example, a component is implemented using software that can be executed by one or more processors.

It is noted that components in the mesh decoder (950), such as the video decoders (960), the auxiliary data decoder (970), the recover module (980), and the mesh reconstruction module (990), can be respectively implemented by various techniques. In an example, a component is implemented by integrated circuitry. In another example, a component is implemented using software that can be executed by one or more processors.

According to an aspect of the disclosure, the segmentation module (920) can perform spatial partition of the input mesh (905). In some examples, the segmentation module (920) can partition the input mesh (905) spatially into segments, and the dynamic range of the attribute values (e.g., 3D xyz coordinates or 2D UV coordinates) of each segment satisfies the requirements of the image/video codec, such as the bitdepth requirement of the video encoders (930). The segments can be any suitable shapes. In an example, the segments can be patches. In another example, the segments in 2D can be in the forms of slices, tiles, CTUs and the like.

In some examples, the input mesh (905) can be partitioned (e.g., by the segmentation module (920)) into several patches, where each patch contains a subset of the whole mesh with triangles that are connected (shares an edge). The dynamic range of attributes values in each segment satisfies the bitdepth requirement of the image/video codec.

In some examples, the attribute value field can be divided into attribute value subfields, and each attribute value subfield satisfy the bitdepth requirement of the image/video codec. The attribute value subfields can be used to assist the partition of the input mesh (905).

Figure 10:
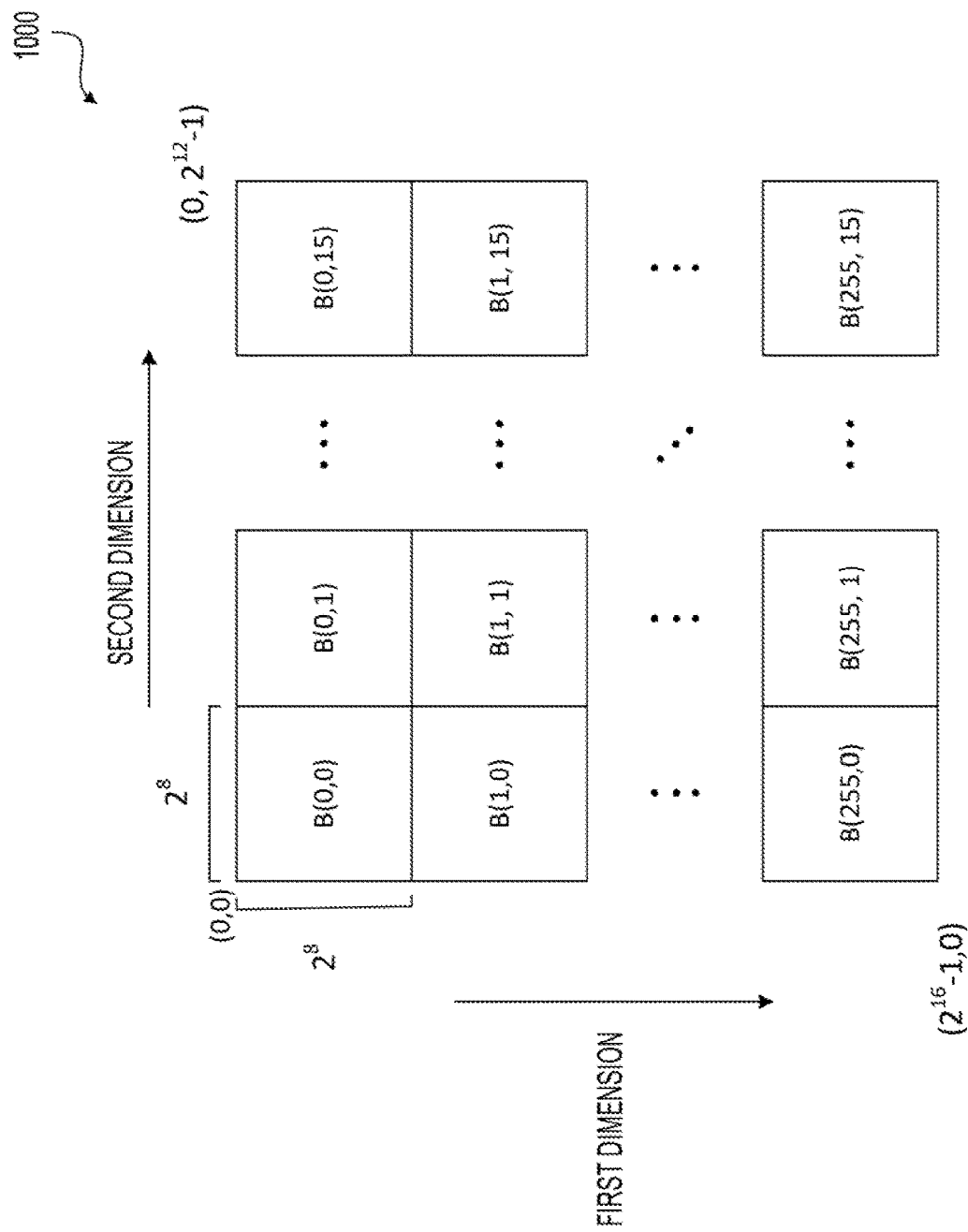
FIG. 10 shows a diagram for illustrating an attribute value field in some examples.

FIG. 10 shows a diagram for illustrating an attribute value field (1000) in some examples. In the FIG. 10 example, the attribute value field (1000) is a 2-dimensional attribute value field, such as a first dimension in vertical direction, and a second dimension in horizontal direction. For example, the first dimension is for light intensities, and the second dimension is for normal values, and the like. While techniques are illustrated with regard to the 2D attribute value field (1000) in FIG. 10, the techniques can be applied to other suitable attribute value field, such as 1D attribute value field, 3D attribute value field (e.g., 3D (x, y, z) value field).

In FIG. 10, attribute values in the first dimension are represented using 16 bits (also referred to as 16 bitdepth), and the attributes values in the second dimension are represented using 12 bits (also referred to as 12 bitdepth. The 2D attribute value field (1000) is divided into 4096 sub-fields B(0,0)-B(255, 15). Each sub-field has a 2D dynamic range of $(2^8, 2^8)$. For example, for the segment B(0,0), the dynamic range of the first dimension is from 0 to $(2^8-1)$, and the dynamic range of the second dimension is from 0 to $(2^8-1)$; for the segment B(0,1), the dynamic range of the first dimension is from 0 to $(2^8-1)$, the dynamic range of the second dimension is from $2^8$ to $(2^9-1)$ (which is equal to $2^8$); for the segment B(1,0), the dynamic range of the first dimension is from $2^8$ to $(2^9-1)$ (which is equal to $2^8$), the dynamic range of the second dimension is from 0 to $(2^8-1)$; for the sub-field B(0,15), the dynamic range of the first dimension is from 0 to $(2^8-1)$, the dynamic range of the second dimension is from $(2^{12}-2^8)$ to $(2^{12}-1)$ (which is equal to $2^8$); so on so forth.

It is noted that while regular partition of the 2D attribute value field (1000) is illustrated in FIG. 10, irregular partition can be used in some examples.

According to an aspect of the disclosure, the segmentation module (920) can perform spatial partition of the input mesh (905) into segments, such that attributes values of each segment is within a sub-field of the attribute value field.

The segmentation module (920) then processes each segment to convert the attribute values in the segmental attribute values that can be represented using the first bitdepth supported by the video encoders (930).

For example, for a segment i, $A_k$ (k=1, ..., $N_i$) denotes the attribute value of the $k^{th}$ sample (or vertex), and $N_i$ is the total number of the samples in the segment i. It is noted that the attribute $A_k$ can represent not only color components, normal, but also 3D xyz coordinates and 2D UV atlas coordinates.

In some examples, the segmentation module (920) determines an anchor value (also referred to as anchor variable in some examples) for the attribute values of the segment i, and then determines the segmental attribute values (also referred to as residual attribute values in some examples) for samples in the segment i based on the anchor value and the attribute values at the samples. It is noted that the anchor value can be a single value or a vector value depending on the dimension of the attribute value field.

In an example, the anchor value of the segment i is the minimum of $A_k$, for k=1, ..., $N_i$. For example, the anchor value (denoted by Anchor) is calculated according to Eq. (1):

$$Anchor = Min_A = \min_{k=1,...,N_i} A_k \qquad \text{Eq. (1)}$$

The segmentation module (920) subtracts the anchor value (Anchor) from the original attribute values at the samples in the segment i to determine residual attribute values (also referred to as segmental attribute values), such as according to Eq. (2)

$$R_k = A_k - Min_A \text{ for } k=1, ..., N_i \qquad \text{Eq. (2)}$$

where $R_k$ denotes the residual attribute values. It is noted that when $A_k$ is a vector of more than one dimension, $Min_A$ can be a vector includes multiple dimensions, and a value for a specific dimension of the vector $Min_A$ is the minimum value of all the attribute vectors $A_k$, for k=1, ..., $N_i$ in the specific dimension.

In another example, the anchor value of the segment i is the maximum value of $A_k$, for k=1, ..., $N_i$. For example, the anchor value (denoted by anchor) is calculated according to Eq. (3)

$$Anchor = Max_A = \max_{k=1,...,N_i} A_k \qquad \text{Eq. (3)}$$

The segmentation module (920) subtracts the original attribute values at samples in the segment i from the anchor value (anchor) to determine residual attribute values (also referred to as segmental attribute values), such as according to Eq. (4):

$$R_k = Max_A - A_k \text{ for } k=1, ..., N_i \qquad \text{Eq. (4)}$$

where $R_k$ denotes the residual attribute values. It is noted that when $A_k$ is a vector of more than one dimension, $Max_A$ can be a vector includes multiple dimensions, and a value for a specific dimension of the vector $Max_A$ is the maximum value of all the attribute vectors $A_k$, for k=1, ..., $N_i$ in the specific dimension.

It is noted that when the dynamic range of the segment i is representable by the first bitdepth, the residual attribute values can be represented by the first bitdepth. Then, the residual attribute values $R_k$ for k=1, ..., $N_i$ can be compressed by suitable codec supporting the first bitdepth, such as by the video encoders (930). In an example, the residual attribute values of various segments can form a residual attribute map. Values in the residual attribute map are represented by bits of the first bitdepth, and can be compressed by a generic image/video codec (for example an 8-bit video codec, an 8-bit image codec, and the like). The residual attribute map can be compressed in either lossless or lossy modes.

In some examples, the auxiliary data encoder (940) can encode the anchor values (e.g., $Min_A$ and/or $Max_A$) associated with the segments into the bitstream (945). In an example, the anchor values can be signaled as the overhead or side information in the bitstream (945).

It is noted that the anchor values of different segments can be coded independently or dependently. In an embodiment, the auxiliary data encoder (940) can encode the anchor values for segments independently. In another embodiment, the auxiliary data encoder (940) can encode the anchor values for the segments using a predictive coding technique. For example, the auxiliary data encoder (940) can encode an anchor value for a segment by encoding a difference of the anchor value to a previous coded anchor value into the bitstream (945). Different predictive coding techniques can be applied to further reduce the number of bits required to represent the anchor values. In some examples, the auxiliary data encoder (940) can also signal a flag to indicate which predictive coding technique is used for coding the anchor value of each segment.

In some examples, the auxiliary data decoder (970) can decode the anchor values associated with the segments from the bitstream (945). It is noted that the anchor values of different segments can be decoded independently or dependently. In an embodiment, the anchor values for each segment can be coded independently. The auxiliary data decoder (970) can decode the anchor values associated with the segments independently from the bitstream (945). In another embodiment, the anchor variable values for each segment can be coded dependently. The auxiliary data decoder (970) can determine an anchor value for a segment based on one or more anchor values for previously decoded segments. In some examples, different predictive techniques can be applied to reduce the number of bits required to represent the anchor values. In an example, the auxiliary data decoder (970) decodes a flag that indicates which predictive technique is used for the anchor value for a current segment, and then applies the predictive technique to determine the anchor value for the current segment based on one or more anchor values of previously decoded segments.

The video decoders (960) can decode the residual attribute map to get residual attribute values for the segments, and provide the decoded residual attribute values to the recover module (980). The recover module (980) can recover attribute values in the second bitdepth based on the anchor values of the segments and the decoded residual attribute values of the segments.

In an example, to recover attribute values for segment i, the recover module (980) can calculate the recovered attribute values (denoted by $A_k'$) for the segment i based on the anchor value $Min_A$ (e.g., determined by the auxiliary data decoder (970)) associated with the segment i and the decoded residual attribute values (denoted by $R_k'$), for example according to Eq. (5):

$$A_k' = R_k' + Min_A \text{ for } k=1, \ldots, N_i \qquad \text{Eq. (5)}$$

In another example, to recover attribute values for segment i, the recover module (980) can calculate the recovered attribute values (denoted by $A_k'$) based on the anchor value $Max_A$ (e.g., determined by the auxiliary data decoder (970)) associated with the segment i and the decoded residual attribute values (denoted by $R_k'$), for example according to Eq. (6):

$$A_k' = Max_A - R_k' \text{ for } k=1, \ldots, N_i \qquad \text{Eq. (6)}$$

According to an aspect of the disclosure, the segmentation module (920) can apply a bitdepth-wise segmentation to generate the segmental attribute values (925) when the bitdepths of attribute values in the input mesh (905) exceeds the bitdepth requirement of the video encoders (930). For example, the segmentation module (920) can segment bits of the second bitdepth (also referred to as a bitdepth plane) into multiple subsets (also referred to as sub bitdepth planes) that each satisfies the bitdepth requirement of the video encoders (930). Thus, for each attribute value, the bits of the attribute values can form multiple segmental attribute values according to the multiple subsets.

Figure 11:
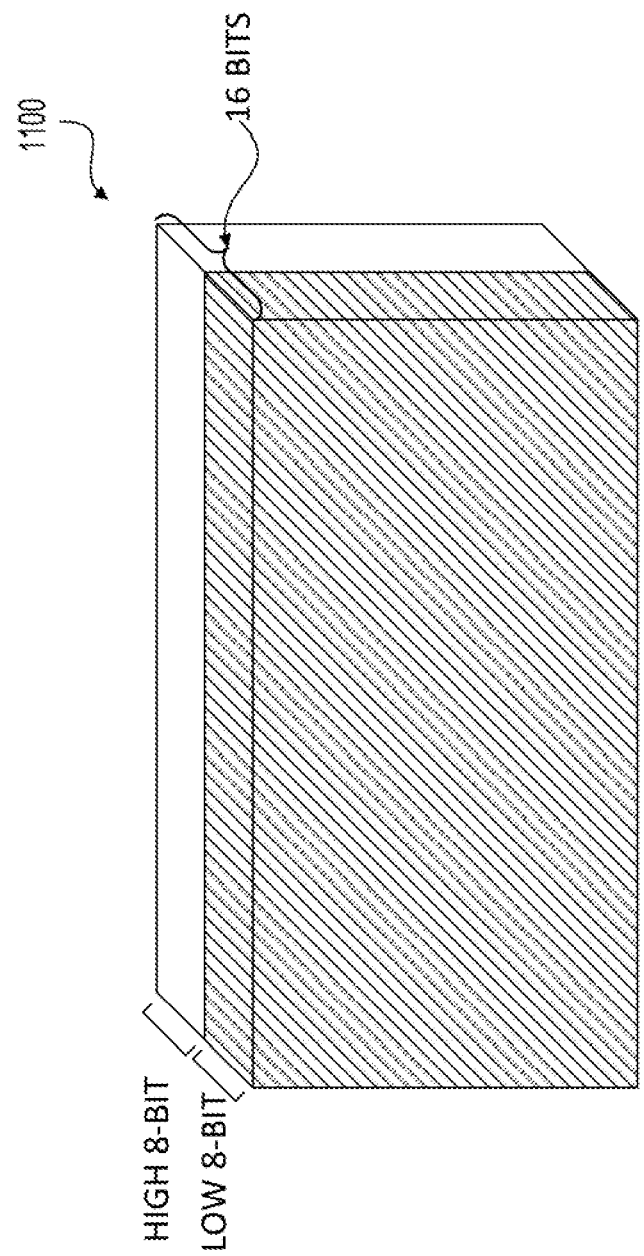
FIG. 11 shows an attribute value plane in some examples.

FIG. 11 shows an attribute value plane (1100) in some examples. For example, the attribute value plane (1100) corresponds to an attribute map, and each sample in the attribute map has an attribute value represented by 16 bits.

In an example, a video codec (e.g., video encoders (930), video decoders (960)) requires 8-bit pixel representation, and each attribute value (e.g., $A_k$) is represented with 16-bit. The segmentation module (920) can partition each attribute value into a first segmental attribute value (shown by low 8-bit) and a second segmental value (shown by high 8-bit). Then, the low 8 bits of all samples in the attribute map form a first segmental attribute map, and the high 8 bits of all samples in the attribute map form a second segmental attribute map. In an example, the first segmental attribute map and the second segmental attribute map can be encoded separately by the 8-bit video codec (e.g., video encoders (930)).

According to an aspect of the disclosure, different configurations can be used for coding different segmental attribute maps to improve an overall compression ratio. For example, a lower quantization parameter (QP) can be applied to the coding of the second segmental attribute map and a higher QP can be applied to the coding of the first segmental attribute map.

In another example, the first segmental attribute map and the second segmental attribute map can be assembled into a larger map in 8-bit pixel representation, and then the assembled larger map can be encoded by the 8-bit video codec (e.g., video encoders (930)).

At the decoder side, in some examples, multiple segmental attribute maps, such as the first segmental attribute map and the second segmental attribute map, can be respectively decoded from the bitstream (945) by the video decoders (960), and the recover module (980) can form a recovered attribute map based on the multiple segmental attribute maps, such as the first segmental attribute map and the second segmental attribute map. In some examples, for a sample in the recovered attribute map, the recover module (980) can concatenate bits of a first segmental attribute value from the first segmental attribute map (e.g., at the corresponding sample position for the sample in the recovered attribute map) with bits of a second segmental attribute value from the second segmental attribute map (e.g., at the corresponding sample position for the sample in the recovered attribute map) to form a recovered attribute value for the sample in the recovered attribute map. For example, the 8 bits of the first segmental attribute value from the first segmental attribute map become the low 8-bit of the recovered attribute value, and the 8 bits of the second segmental attribute value from the second segmental attribute map become the high 8-bit of the recovered attribute value.

Figure 12:
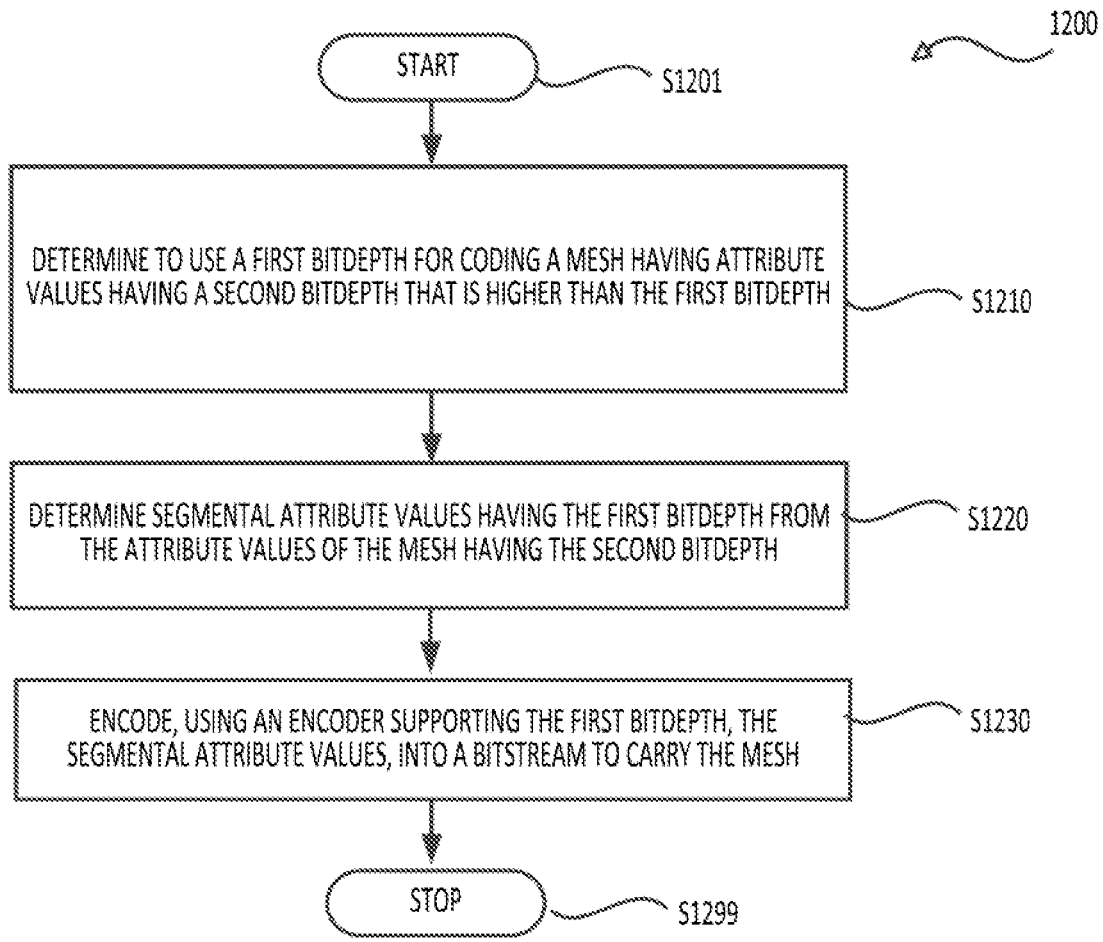
FIG. 12 shows a flow chart outlining a process example in some examples.

FIG. 12 shows a flow chart outlining a process (1200) according to an embodiment of the disclosure. The process (1200) can be used during an encoding process for a mesh. In various embodiments, the process (1200) is executed by processing circuitry. In some embodiments, the process (1200) is implemented in software instructions, thus when the processing circuitry executes the software instructions, the processing circuitry performs the process (1200). The process starts at (S1201) and proceeds to (S1210).

At (S1210), a use of a first bitdepth for coding a mesh is determined. The mesh includes attribute values having a second bitdepth that is higher than the first bitdepth. In some examples, generic image/video codec is determined for coding a mesh. The generic image/video codec supports 8-bit coding, while the mesh includes attribute values, such as geometry map and the like, having higher bitdepth, such as 10-bit, 12-bit, 16-bit, and the like.

At (S1220), segmental attribute values having the first bitdepth are determined from the attribute values of the mesh having the second bitdepth.

At (S1230), the segmental attribute values are encoded into a bitstream to carry the mesh using an encoder supporting the first bitdepth. For example, a map of samples having the segmental attribute values is encoded by a generic image/video encoder.

In some embodiments, the mesh is partitioned into a plurality of spatial segments. A dynamic range of first attribute values in a first spatial segment of the mesh is representable by the first bitdepth. In some examples, one or more maps of the mesh (e.g., geometry map, texture maps, attribute maps) can be partitioned into segments, such as in the forms of slices, tiles, UV patches, CTUs, and the like. Each segment corresponds to a subset of the mesh. The dynamic range of values in each segment is representation by the first bitdepth. For example, the dynamic range is equal or smaller than 255 when the first bitdepth is 8-bit.

In some examples, for the first spatial segment, a first anchor value is determined based on the first attribute values in the first spatial segment, and then first segmental attribute values are determined respectively for the first attribute values based on the first anchor value. The first segmental attribute values are of the first bitdepth.

In an example, the first anchor value is determined to be a maximum value in the first attribute values, and the first segmental attribute values are determined by respectively subtracting the first attribute values from the first anchor value.

In another example, the first anchor value is determined to be a minimum value in the first attribute values, and the first segmental attribute values are determined by subtracting the first anchor value respectively from the first attribute values.

In some examples, anchor values for the spatial segments are encoded independently. For example, the first anchor value for the first spatial segment and a second anchor value for a second spatial segment are encoded into the bitstream independently.

In some examples, anchor values for the spatial segments can be encoded using predictive coding. For example, a second anchor value for a second spatial segment is encoded at least partially based on the first anchor value. In an example, a difference of the second anchor value and the first anchor value is encoded into the bitstream. In another example, a flag can be encoded to indicate which prediction method is used for encoding the second anchor value for the second spatial segment.

In some embodiments, bits of the second bitdepth are segmented into at least a first subset and a second subset. For example, 16 bits can be segmented into higher 8-bits and lower 8-bits. In some examples, first segmental attribute values for the attribute values are formed based on the first subset in the bits of the second bitdepth, and second segmental attribute values for the attribute values are based on the second subset in the bits of the second bitdepth. In an example, a map of attribute values can be segmented into a first segmental map and a second segmental map. The first segmental map is formed by the first segmental attribute values, and each first segmental attribute value at a sample includes the higher 8-bits of the attribute value of the sample in the map sample. The second segmental map is formed by the second segmental values, and each second segmental attribute value at a sample includes the lower 8-bits of the attribute value of the sample in the map.

In an example, the first segmental map and the second segmental map are encoded for example using generic image/video encoder.

In some examples, the first segmental attribute values are according to a first decoding configuration, and the second segmental attribute values are encoded according to a second decoding configuration that is different from the first decoding configuration. In an example, the first segmental map is encoded according to a first quantization parameter, and the second segmental map is encoded according to a second quantization parameter that is different from the first quantization parameter.

Then, the process proceeds to (S1299) and terminates.

The process (1200) can be suitably adapted. Step(s) in the process (1200) can be modified and/or omitted. Additional step(s) can be added. Any suitable order of implementation can be used.

Figure 13:
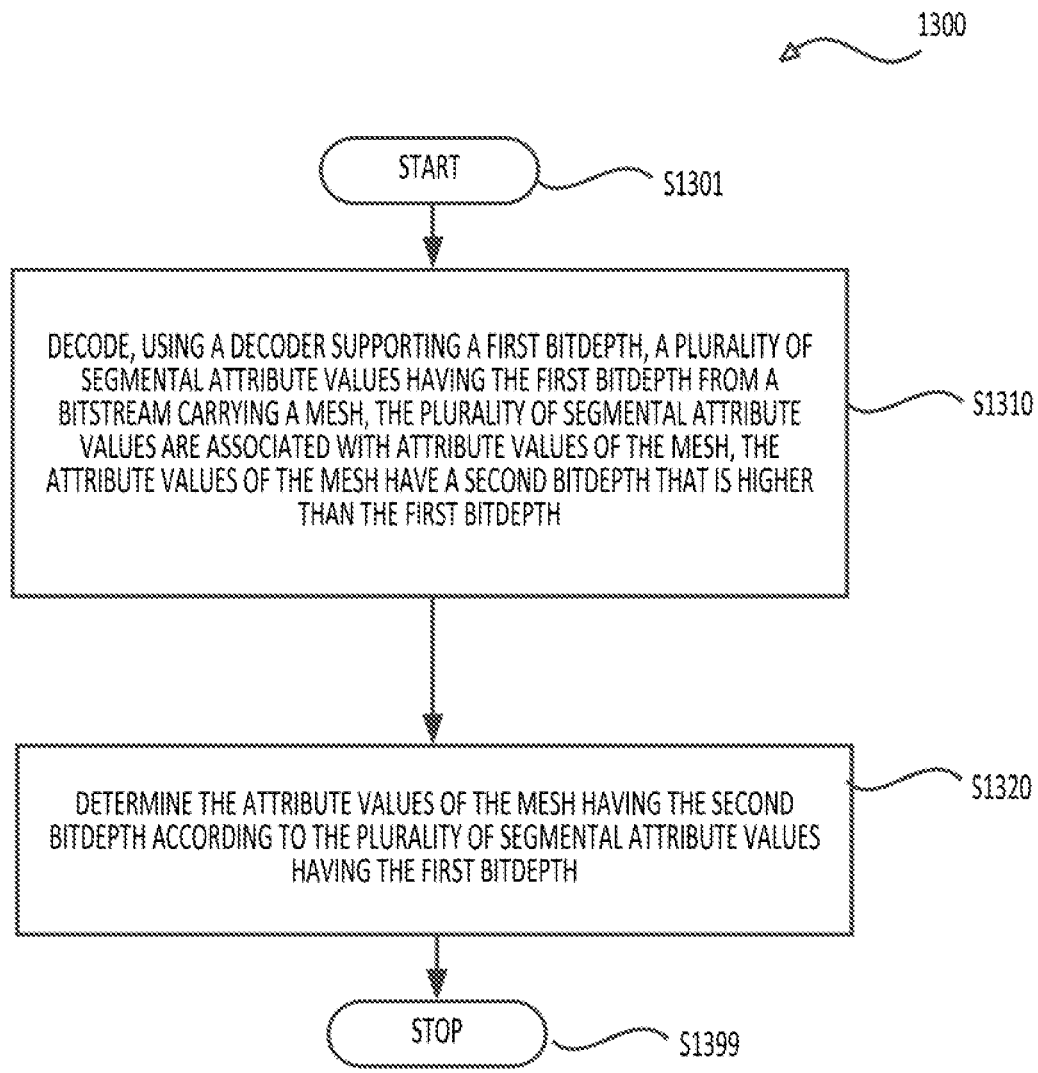
FIG. 13 shows a flow chart outlining a process example in some examples.

FIG. 13 shows a flow chart outlining a process (1300) according to an embodiment of the disclosure. The process (1300) can be used during a decoding process for a mesh. In various embodiments, the process (1300) is executed by processing circuitry. In some embodiments, the process (1300) is implemented in software instructions, thus when the processing circuitry executes the software instructions, the processing circuitry performs the process (1300). The process starts at (S1301) and proceeds to (S1310).

At (S1310), a plurality of segmental attribute values having a first bitdepth is decoded from a bitstream carrying a mesh by using a decoder supporting the first bitdepth. The plurality of segmental attribute values are associated with attribute values of the mesh. The attribute values of the mesh have a second bitdepth that is higher than the first bitdepth.

At (S1320), the attribute values of the mesh having the second bitdepth are determined according to the plurality of segmental attribute values having the first bitdepth.

In some embodiments, the plurality of segmental attribute values is associated with a first spatial segment of the mesh, a dynamic range of first attribute values in the first spatial segment of the mesh is representable by the first bitdepth. In some examples, a first anchor value associated with the first spatial segment is decoded from the bitstream, and the first attribute values in the first spatial segment are determined by combining the first anchor value with the plurality of segmental attribute values. In an example, the first anchor value is added with a segmental attribute value in the plurality of segmental attribute values to determine an attribute value in the first attribute values. In another example, a segmental attribute value in the plurality of segmental attribute values is subtracted from the first anchor value to determine an attribute value in the first attribute values.

In some examples, the first anchor value associated with the first spatial segment is decoded from the bitstream independently from other anchor values.

In some examples, the first anchor value associated with the first spatial segment is determined at least partially based on another anchor value associated with another spatial segment.

In some embodiments, the plurality of segmental attribute values includes at least a first segmental attribute value corresponding to a first subset of bits for an attribute value of the second bitdepth and a second segmental attribute value corresponding to a second subset of bits for the attribute value of the second bitdepth. In an example, the first subset of bits is concatenated with the second subset of bits to determine the attribute value.

In some examples, a first plurality of segmental attribute values including the first segmental attribute value is decoded according to a first decoding configuration, and a second plurality of segmental attribute values including the second segmental attribute value is decoded according to a second decoding configuration that is different from the first decoding configuration.

Then, the process proceeds to (S1399) and terminates.

The process (1300) can be suitably adapted. Step(s) in the process (1300) can be modified and/or omitted. Additional step(s) can be added. Any suitable order of implementation can be used.

The techniques disclosed in the present disclosure may be used separately or combined in any order. Further, each of the techniques (e.g., methods, embodiments), encoder, and decoder may be implemented by processing circuitry (e.g., one or more processors or one or more integrated circuits). In some examples, the one or more processors execute a program that is stored in a non-transitory computer-readable medium.

The techniques described above, can be implemented as computer software using computer-readable instructions and physically stored in one or more computer-readable media. For example, FIG. 14 shows a computer system (1400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 14:
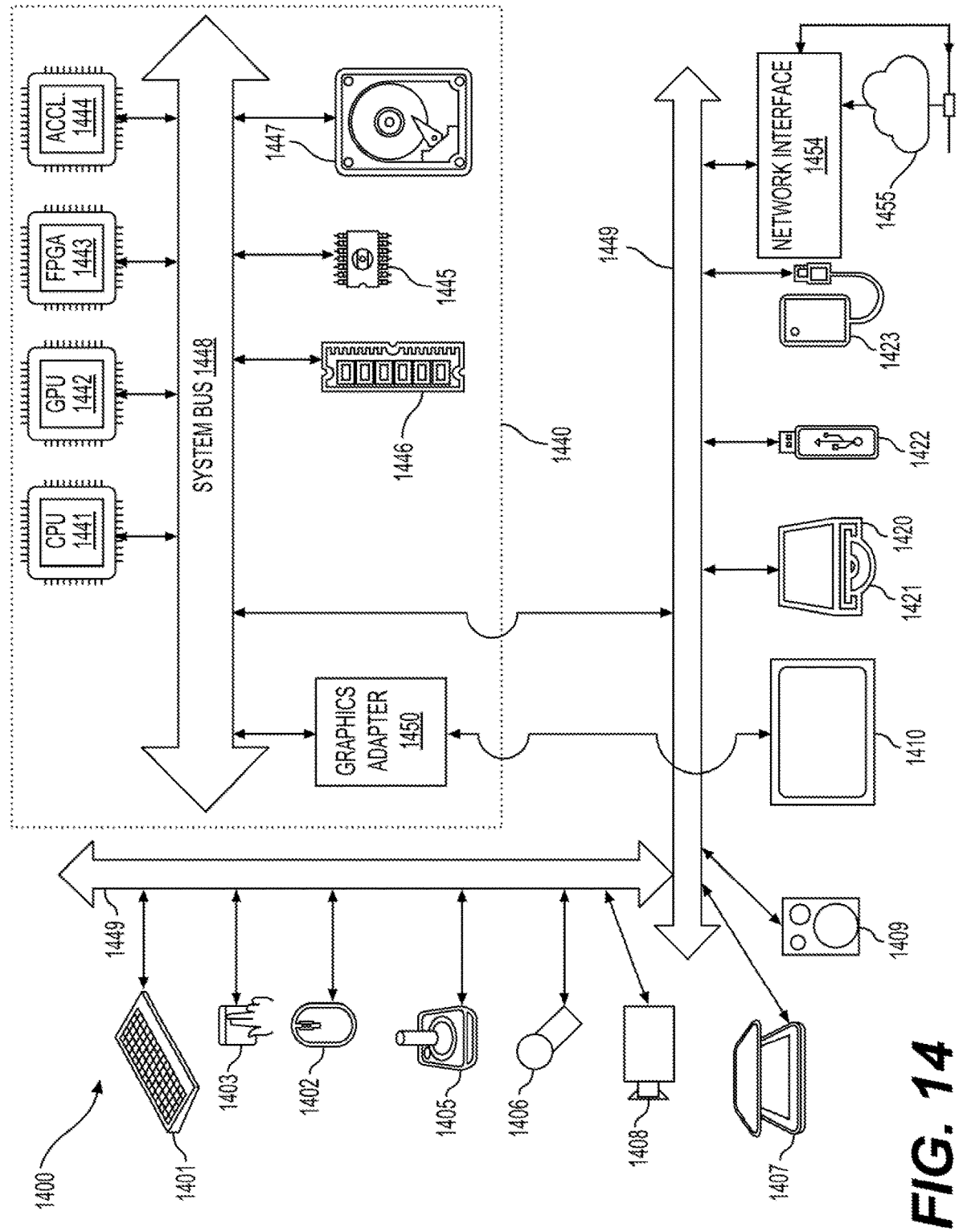
FIG. 14 is a schematic illustration of a computer system in some examples.

The components shown in FIG. 14 for computer system (1400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1400).

Computer system (1400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1401), mouse (1402), trackpad (1403), touch screen (1410), data-glove (not shown), joystick (1405), microphone (1406), scanner (1407), camera (1408).

Computer system (1400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1410), data-glove (not shown), or joystick (1405), but there can also be tactile feedback devices that do not serve as input devices), audio output devices (such as: speakers (1409), headphones (not depicted)), visual output devices (such as screens (1410) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1400) can also include human accessible storage devices and their associated media such as optical media including CD/DVD ROM/RW (1420) with CD/DVD or the like media (1421), thumb-drive (1422), removable hard drive or solid state drive (1423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1400) can also include an interface (1454) to one or more communication networks (1455). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1449) (such as, for example USB ports of the computer system (1400)); others are commonly integrated into the core of the computer system (1400) by attachment to a system bus as described below (for example Ethernet interface into a PC computer system or cellular network interface into a smartphone computer system). Using any of these networks, computer system (1400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1440) of the computer system (1400).

The core (1440) can include one or more Central Processing Units (CPU) (1441), Graphics Processing Units (GPU) (1442), specialized programmable processing units in the form of Field Programmable Gate Areas (FPGA) (1443), hardware accelerators for certain tasks (1444), graphics adapters (1450), and so forth. These devices, along with Read-only memory (ROM) (1445), Random-access memory (1446), internal mass storage such as internal non-user accessible hard drives, SSDs, and the like (1447), may be connected through a system bus (1448). In some computer systems, the system bus (1448) can be accessible in the form of one or more physical plugs to enable extensions by additional CPUs, GPU, and the like. The peripheral devices can be attached either directly to the core's system bus (1448), or through a peripheral bus (1449). In an example, the screen (1410) can be connected to the graphics adapter (1450). Architectures for a peripheral bus include PCI, USB, and the like.

CPUs (1441), GPUs (1442), FPGAs (1443), and accelerators (1444) can execute certain instructions that, in combination, can make up the aforementioned computer code. That computer code can be stored in ROM (1445) or RAM (1446). Transitional data can be also be stored in RAM (1446), whereas permanent data can be stored for example, in the internal mass storage (1447). Fast storage and retrieve to any of the memory devices can be enabled through the use of cache memory, that can be closely associated with one or more CPU (1441), GPU (1442), mass storage (1447), ROM (1445), RAM (1446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1400), and specifically the core (1440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1440) that are of non-transitory nature, such as core-internal mass storage (1447) or ROM (1445). The software implementing various embodiments of the present disclosure can be stored in such devices and executed by core (1440). A computer-readable medium can include one or more memory devices or chips, according to particular needs. The software can cause the core (1440) and specifically the processors therein (including CPU, GPU, FPGA, and the like) to execute particular processes or particular parts of particular processes described herein, including defining data structures stored in RAM (1446) and modifying such data structures according to the processes defined by the software. In addition or as an alternative, the computer system can provide functionality as a result of logic hardwired or otherwise embodied in a circuit (for example: accelerator (1444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for mesh decompression by processing circuitry of a decoder, comprising:
    decoding, using the processing circuitry of the decoder supporting a first bitdepth, a plurality of segmental attribute values having the first bitdepth from a bitstream carrying a mesh that represents a surface of an object, the plurality of segmental attribute values associated with attribute values of the mesh, the attribute values of the mesh having a second bitdepth that is higher than the first bitdepth; and
    determining the attribute values of the mesh having the second bitdepth according to the plurality of segmental attribute values having the first bitdepth.

2. The method of claim 1, wherein the plurality of segmental attribute values is associated with a first spatial segment of the mesh, the first spatial segment of the mesh including first attribute values, a dynamic range of the first attribute values in the first spatial segment of the mesh is representable by the first bitdepth.

3. The method of claim 2, further comprising:
    decoding a first anchor value associated with the first spatial segment from the bitstream; and
    determining the first attribute values in the first spatial segment by combining the first anchor value with the plurality of segmental attribute values.

4. The method of claim 3, further comprising:
    adding the first anchor value with a segmental attribute value in the plurality of segmental attribute values to determine an attribute value in the first attribute values.

5. The method of claim 3, further comprising:
    subtracting a segmental attribute value in the plurality of segmental attribute values from the first anchor value to determine an attribute value in the first attribute values.

6. The method of claim 3, further comprising:
    decoding the first anchor value associated with the first spatial segment independently of other anchor values associated with other spatial segments.

7. The method of claim 3, further comprising:
    determining the first anchor value associated with the first spatial segment at least partially based on another anchor value associated with another spatial segment.

8. The method of claim 1, wherein the plurality of segmental attribute values comprises at least a first segmental attribute value corresponding to a first subset of bits for an attribute value of the second bitdepth and a second segmental attribute value corresponding to a second subset of bits for the attribute value of the second bitdepth.

9. The method of claim 8, further comprising:
    concatenating the first subset of bits with the second subset of bits to determine the attribute value.

10. The method of claim 8, further comprising:
  decoding, a first plurality of segmental attribute values including the first segmental attribute value according to a first decoding configuration; and
  decoding, a second plurality of segmental attribute values including the second segmental attribute value according to a second decoding configuration that is different from the first decoding configuration.

11. A method for mesh encoding by an encoder, comprising:
  encoding a plurality of segmental attribute values having a first bitdepth into a bitstream carrying a mesh that represents a surface of an object, the plurality of segmental attribute values associated with attribute values of the mesh, the attribute values of the mesh having a second bitdepth that is higher than the first bitdepth; and
  encoding the attribute values of the mesh having the second bitdepth according to the plurality of segmental attribute values having the first bitdepth.

12. The method of claim 11, wherein the plurality of segmental attribute values is associated with a first spatial segment of the mesh, the first spatial segment of the mesh including first attribute values, a dynamic range of the first attribute values in the first spatial segment of the mesh is representable by the first bitdepth.

13. The method of claim 12, further comprising:
  determining a first anchor value associated with the first spatial segment from the bitstream; and
  determining the first attribute values in the first spatial segment by combining the first anchor value with the plurality of segmental attribute values.

14. The method of claim 13, further comprising:
  adding the first anchor value with a segmental attribute value in the plurality of segmental attribute values to determine an attribute value in the first attribute values.

15. The method of claim 13, further comprising:
  subtracting a segmental attribute value in the plurality of segmental attribute values from the first anchor value to determine an attribute value in the first attribute values.

16. The method of claim 13, further comprising:
  determining the first anchor value associated with the first spatial segment independently of other anchor values associated with other spatial segments.

17. The method of claim 13, further comprising:
  determining the first anchor value associated with the first spatial segment at least partially based on another anchor value associated with another spatial segment.

18. The method of claim 11, wherein the plurality of segmental attribute values comprises at least a first segmental attribute value corresponding to a first subset of bits for an attribute value of the second bitdepth and a second segmental attribute value corresponding to a second subset of bits for the attribute value of the second bitdepth.

19. The method of claim 18, further comprising:
  concatenating the first subset of bits with the second subset of bits to determine the attribute value.

20. A method of processing mesh data, the method comprising:
  processing a bitstream of the mesh data according to a format rule, wherein:
  the bitstream includes coded information of a mesh, the mesh including attribute values; and
  the format rule specifies that:
    using processing circuitry of a decoder supporting a first bitdepth, a plurality of segmental attribute values having the first bitdepth is decoded from the bitstream carrying the mesh that represents a surface of an object, the plurality of segmental attribute values associated with the attribute values of the mesh, the attribute values of the mesh having a second bitdepth that is higher than the first bitdepth; and
    the attribute values of the mesh having the second bitdepth are determined according to the plurality of segmental attribute values having the first bitdepth.

* * * * *